United States Patent

Nakagaki et al.

Patent Number: 6,099,983
Date of Patent: Aug. 8, 2000

[54] FUEL CELL CONTAINING A FUEL SUPPLY MEANS, GAS GENERATING MEANS AND TEMPERATURE CONTROL MEANS OPERATED TO PREVENT THE DEPOSITION OF CARBON

[75] Inventors: Takao Nakagaki, Tama; Takashi Ogawa; Michio Hori, both of Yokohama; Toshiaki Hayashi, Tokyo-to; Takehito Nishida, Yokohama, all of Japan

[73] Assignee: Kabushiki Kaisha Toshiba, Kawasaki, Japan

[21] Appl. No.: 08/953,783

[22] Filed: Oct. 17, 1997

[30] Foreign Application Priority Data

Oct. 18, 1996 [JP] Japan .................................. 8-275946
Oct. 9, 1997 [JP] Japan .................................. 9-277432

[51] Int. Cl.$^7$ ...................................................... H01M 8/04
[52] U.S. Cl. .............................................. 429/13; 429/26
[58] Field of Search .............................. 429/26, 13, 17, 429/19, 46

[56] References Cited

U.S. PATENT DOCUMENTS

| | | | |
|---|---|---|---|
| 4,524,113 | 6/1985 | Lesieur | 429/16 |
| 4,810,485 | 3/1989 | Marianowski et al. | 423/648.1 |
| 4,917,971 | 4/1990 | Farooque | 429/19 |
| 5,077,148 | 12/1991 | Schora et al. | 429/16 |
| 5,175,995 | 1/1993 | Pak et al. | 60/39.182 |
| 5,247,791 | 9/1993 | Pak et al. | 60/39.182 |
| 5,658,681 | 8/1997 | Sato et al. | 429/13 |
| 5,683,828 | 11/1997 | Spear et al. | 429/13 |

FOREIGN PATENT DOCUMENTS

| | | |
|---|---|---|
| 44 46 841 | 7/1996 | Germany . |
| 61-24169 | 2/1986 | Japan . |
| 61-285676 | 12/1986 | Japan . |
| 3-258902 | 11/1991 | Japan . |

*Primary Examiner*—Maria Nuzzolillo
*Assistant Examiner*—Monique Wills
*Attorney, Agent, or Firm*—Oblon, Spivak, McClelland, Maier & Neustadt, P.C.

[57] ABSTRACT

A fuel cell includes: a fuel supplying portion for supplying a fuel which is reformed at a temperature below 450° C.; a gas generating portion for reforming the supplied fuel to generate a hydrogen containing gas; a temperature control portion for rapidly raising the temperature of the reformed hydrogen containing gas from 450° C. to 600° C. to supply the hydrogen containing gas while maintaining the temperature thereof; and a power generating portion for allowing the temperature controlled fuel to react with a separately supplied oxidizer to generate electricity. The power generating portion comprises at least a fuel electrode, to which the fuel temperature-controlled by the temperature control portion is supplied, and an oxidizer electrode, which is provided so as to face the fuel electrode via an electrolyte layer 6. A plurality of single cells with this construction may be laminated to form a laminated body 12. The fuel may be alcohols, such as methanol and ethanol, dimethyl ether, and propane. With this construction, if a fuel having a lower reforming temperature than Boudard reaction temperature is used, it is possible to inhibit carbon from being deposited and to obtain a uniform temperature distribution, so that it is possible to generate electricity for a long time.

26 Claims, 16 Drawing Sheets

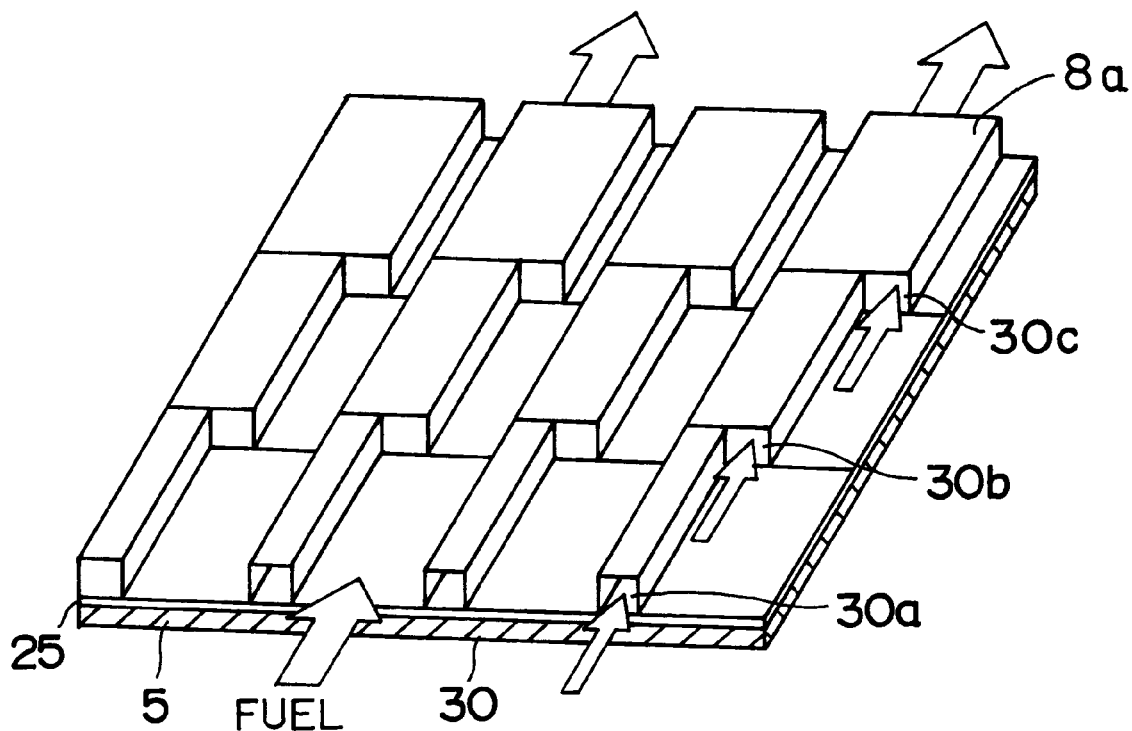
F I G. 11
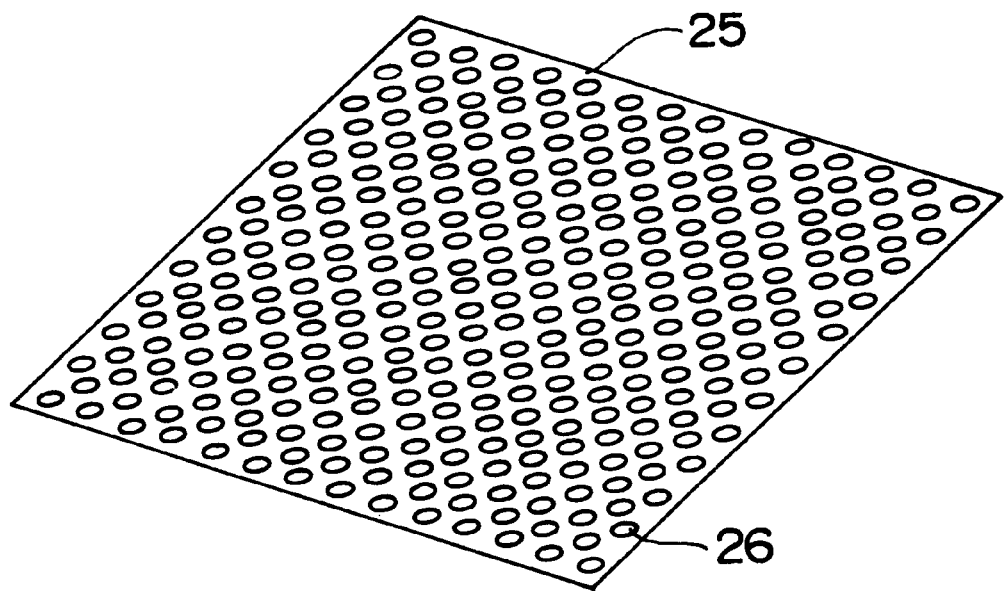
F I G. 12

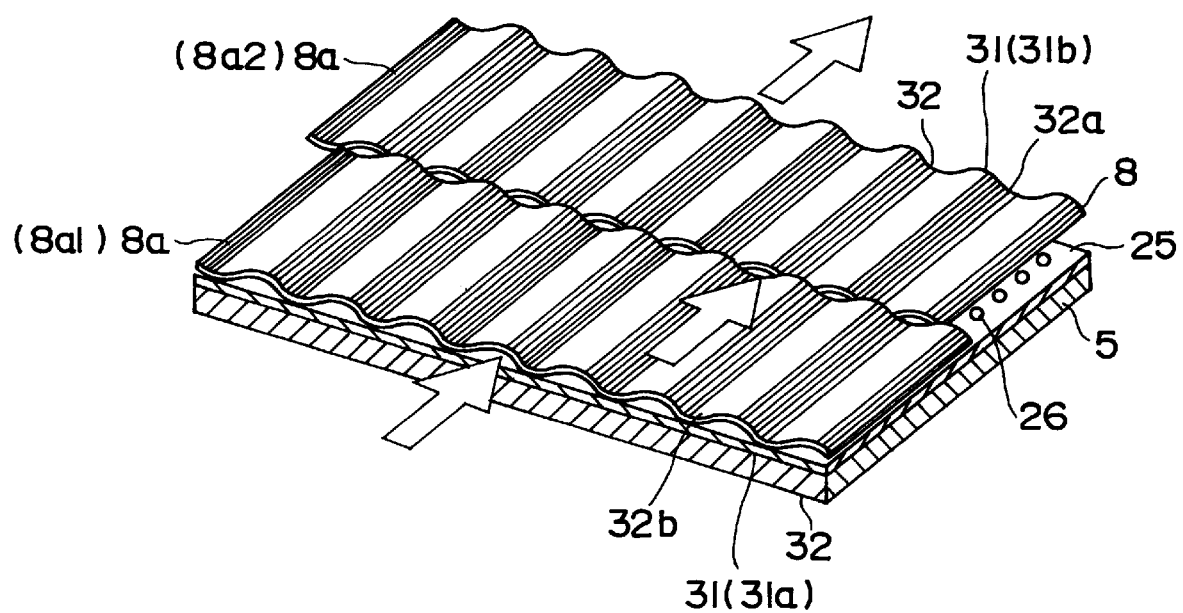
F I G. 13

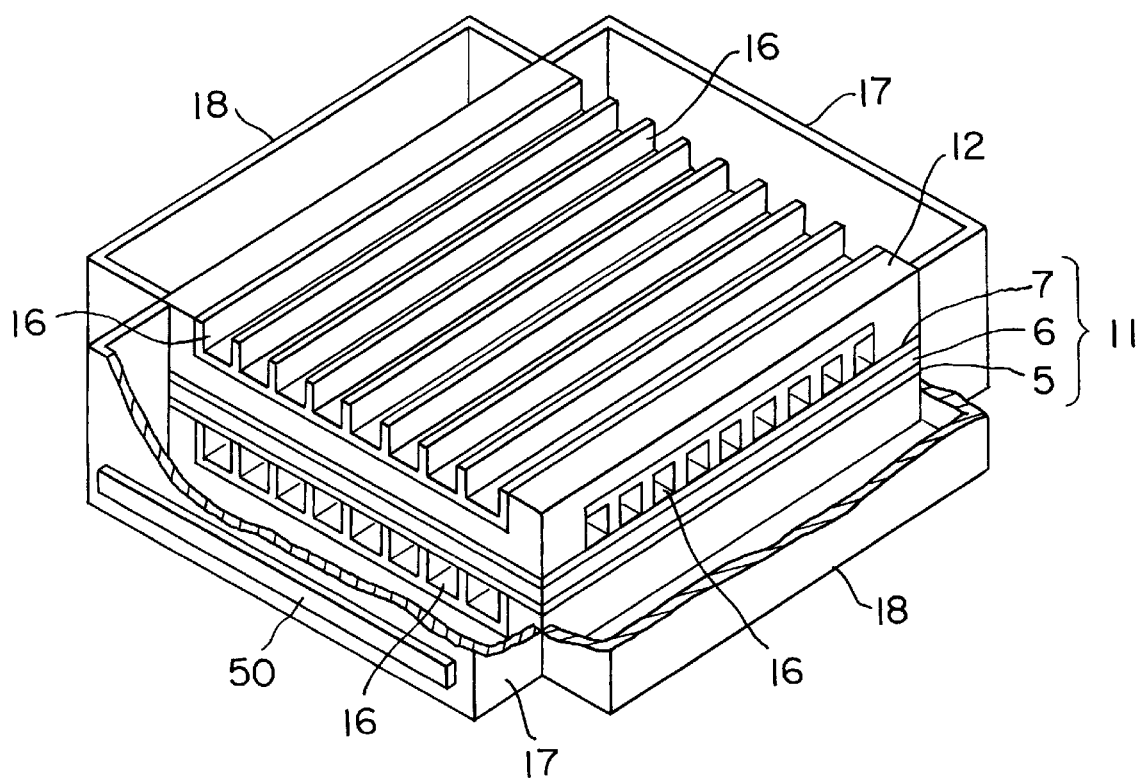
F I G. 22

FUEL CELL CONTAINING A FUEL SUPPLY MEANS, GAS GENERATING MEANS AND TEMPERATURE CONTROL MEANS OPERATED TO PREVENT THE DEPOSITION OF CARBON

BACKGROUND OF THE INVENTION

The present invention relates generally to a fuel cell. More specifically, the invention relates to a fused carbonate fuel cell using methanol as a fuel.

A fuel cell is a power plant for directly converting chemical energy having a fuel into electric energy by an electrochemical reaction. It is noticeable that the fuel cell serves as an efficient and clean energy source since it does not burn the fuel. Such a fuel cell is defined as a cell which continuously removes a product by continuously supplying a reactant from the outside using the construction of its cell system as it is, and can be used as a permanent generating system if the construction of the cell system, the life of the fuel supply system and so forth permit.

In order to cause an electrochemical reaction in the fuel cell to generate electricity, a fuel gas, which is obtained by reforming a usual fossil fuel, such as a petroleum, a natural gas (methane) and a coal, into hydrogen (and carbon monoxide), is supplied to the cell to cause an electrode reaction in the cell. This fossil fuel reforming type fuel cell generating system uses a phosphoric acid aqueous solution, a fused alkali carbonate, a solid electrolyte or the like as an electrolyte. The second-generation system is a fused carbonate fuel cell which uses a fused carbonate. In this fused carbonate fuel cell, although the fuel gas can be generated from methane ($CH_4$) ethane($CH_3CH_3$) or the like, methane obtained as a natural gas (or a substitute natural gas) is often reformed to be used as the fuel gas. In a case where methane is reformed to be used as the fuel gas, the reforming temperature of methane is in the range of from 750° C. to 900° C., and is higher than the operating temperature of the fused carbonate fuel cell which is in the range of 600° C. to 750° C.

An example of the aforementioned internal reforming type fuel cell, which uses a fuel obtained by reforming methane, is disclosed in Japanese Patent Laid-Open No. 6-310158. In a case where methane is used as a fuel of a fuel cell, it is required to carefully carry out the transportation, control and so forth of the fuel and to strictly store the fuel in a spherical tank or the like, since methane is basically a colorless, odorless and flammable gas. In order to eliminate such administrative problems of methane, although there is a method for liquefying a natural gas, there is also proposed a fuel cell using, as a fuel, an alcohol, which can be easily transported and controlled and which is an inexpensive liquid. The alcohols serving as a fuel include methanol (=methyl alcohol $CH_3OH$), ethanol (=ethyl alcohol $C_2H_5OH$), dimethyl ether ($C_2H^6O$) and propane ($CH_3CH_2CH_3$). All the reforming temperatures of these alcohols are 450° C. or higher. Among these alcohols, methanol, which is easily available as a main component of a liquefied natural gas (LNG) and controllable, is most preferred.

In a case where, e.g., methanol ($CH_3OH$) is reformed to be used as a fuel gas, the chemical reactions expressed by the following formulae (1), (2) and (3) occur substantially at the same time.

  (1)

  (2)

  (3)

Formula (1) shows a methanol steam reforming reaction, formula (2) shows a water gas shift reaction, and formula (3) shows a Boudard reaction.

The aforementioned steam reforming occurs at a relatively low temperature of 200° C. to 300° C. A gas, which is obtained by vaporizing an alcohol such as methanol or ether and mixing the vaporized alcohol or ether with steam, may be used as a fuel. In a case where methanol is used as a fuel, a reforming reaction for converting methanol into water gas occurs, so that a reformer for allowing a reforming reaction is provided outside a fuel cell to supply the reformed fuel to the fuel cell. Such a reformed fuel is supplied to the fuel cell via a fuel gas pipe and a manifold, so that the path for supplying the fuel gas is relatively long.

In the aforementioned conventional fuel cell, after the reforming of methanol, the operating temperature of the fused carbonate fuel cell is in the range of from 600° C. to 750° C. On the other hand, in a case where a fuel reformed at a temperature of 200° C. to 300° C., such as methanol, is used, there is a problem in that carbon is deposited while supplying a fuel gas to the fuel cell as shown in the aforementioned formula (3). The deposition of carbon is a common problem in a case where alcohols having a reforming temperature below 450° C. are used as a fuel gas.

At a temperature range of about 500° C. to about 550° C., the Boudard reaction represented by formula (3) is easy to occur in comparison with the shift reaction represented by formula (2), so that carbon is easily deposited. Since the deposited carbon is a solid, it is adhered to the fuel gas pipe, through which the fuel gas passes, so that the fuel gas pipe may clog up after the fuel cell is used for a long time. The fuel cell, which can not supply the fuel gas due to the clogging of the fuel gas pipe, can not generate electricity, so that the operating temperature during the generation of electrical energy must be temporally decreased to disassemble the gas pipe provided for the fuel cell, to remove carbon or change the gas pipe itself. This is a critical problem in fuel cells.

FIG. 1 shows the relationship between various chemical reactions occurring in a fuel cell and temperature. It can be clearly seen from this graph that a cell reaction occurs at a temperature above 650° C., and the reforming temperature of methane ($CH_4$), which allows methane to react with water to generate a hydrogen containing gas, is above 600° C., at which carbon is not deposited. On the other hand, the reforming temperature of methanol ($CH_3OH$), which allows methanol to react with water to generate a hydrogen containing gas, is below 450° C. Therefore, in the case of methanol, before the temperature reaches a temperature range for causing a cell reaction after reforming, it passes through a temperature range of 500° C. to 550° C. Since carbon is deposited by the Boudard reaction in this temperature range as mentioned above, if the reformed methanol is gradually heated to the temperature range of the cell reaction, carbon is adhered to the inner wall of the passage for supplying methanol.

Referring to FIG. 2, the aforementioned chemical reactions will be described in detail below.

FIG. 2 is a graph showing the relationship between the chemical reaction rate and the amount of deposited carbon versus temperature. In FIG. 2, the solid line shows the chemical reaction rate, and the broken line shows the amount of deposited carbon. In a temperature range above 550° C., the reaction rate of the carbon deposition increases, whereas the amount of deposited carbon decreases as the temperature rises if the amount of humidification (the amount of steam contained in the fuel) is the same. On the other hand, in a temperature range below 500° C., carbon is easily deposited, whereas the reaction rate decreases greatly in accordance with Arrhenius' equation.

Therefore, in a case where methanol used as a fuel gas is directly reformed outside the fuel cell, there is a problem in that carbon is deposited in a fuel cell (e.g., a fused carbonate fuel cell) having an operating temperature of 600° C. to 700° C.

Although it is also possible to inhibit carbon from being deposited by increasing the amount of humidification, the generating efficiency decreases as the amount of humidification increases. Therefore, in order to inhibit the deposition of carbon without decreasing the generating efficiency, a fuel gas pipe (including a manifold), which is provided between a tank for storing a fuel gas and a fuel cell body (usually called a laminated body) for receiving the fuel gas and through which the fuel gas having a temperature range of 500° C. to 550° C. passes, must be as short as possible.

However, since the conventional manifold is an external manifold provided outside a fuel cell body, it is naturally cooled in the installation environmental conditions of the fuel cell to a lower temperature than the operating temperature by about 100° C. to about 150° C. Therefore, the temperature of the manifold is in a temperature range, in which carbon is deposited, so that carbon is deposited.

In addition, unless the reforming conditions (temperature and so forth) are controlled immediately after methanol reaches the anode (electrode) of the fuel cell body, the reforming reaction occurs at the inlet of the anode, so that methanol is reformed to locally decrease the temperature to the range of from 500° C. to 550° C. If the temperature decreases, there is a problem in that carbon is deposited.

Moreover, since methanol has a low vaporization temperature of about 65° C. and is easily reformed, it is not possible to surely grasp which portion of the fuel cell system allows vaporization and the reforming reaction to occur, so that it has a great influence on the redundancy and the generating efficiency of the fuel cell system.

In addition, if the reforming reaction and the endothermic property during vaporization can be utilized, it is possible to obtain a uniform temperature distribution of the fuel cell body and to use the reforming reaction and the endothermic as means for cooling a portion to be locally cooled. However, this method can not be easily carried out, and the reforming reaction is difficult to occur.

SUMMARY OF THE INVENTION

It is therefore an object of the present invention to eliminate the aforementioned problems and to provide a long-lived fuel cell, which can inhibit the deposition of carbon without decreasing the generating efficiency by controlling the reforming temperature of methanol and which can suppress respective elements from being deteriorated.

In order to accomplish the aforementioned and other objects, according to one aspect of the present invention, a fuel cell comprises: fuel supply means for supplying a fuel having a reforming temperature lower than a first predetermined temperature; gas generating means for reforming or decomposing a fuel supplied from the fuel supply means, to generate a hydrogen containing gas which contains at least hydrogen; temperature control means for raising the temperature of the hydrogen containing gas generated by the gas generating means from a second predetermined temperature to a third predetermined temperature, and for maintaining the temperature of the hydrogen containing gas at least at the third predetermined temperature; and power generating means including an electrode having at least one pair of electrodes including a fuel electrode, to which the temperature controlled hydrogen containing gas is supplied, and an oxidizer electrode, which is arranged so as to face the fuel electrode via an electrolyte layer and to which an oxidizer is supplied.

The first predetermined temperature of the fuel supplied from the fuel supply means may be 450° C., and the temperature control means may raise the temperature of the hydrogen containing gas from 300° C. serving as the second predetermined temperature to 600° C. serving as the third predetermined temperature, and controls to maintain the temperature of the hydrogen containing gas at a temperature above 600° C. serving as the third predetermined temperature before the hydrogen containing gas is supplied to the fuel electrode.

The power generating means may comprise a plurality of laminated single cells, each of which comprises a pair of the fuel electrode and the oxidizer electrode which face each other via the electrolyte layer, and the temperature control means may have a fluid passage extending in a direction perpendicular to the laminating direction of the single cells of the power generating means.

The temperature control means may have heating means provided in a manifold which extends from reforming means for reforming methanol into a hydrogen containing gas to the fluid passage.

The fuel may be methanol, and the fuel supply means may supply methanol to the power generating means. The supplied methanol may be started to be reformed at a temperature of about 300° C. and heated from about 450° C. to about 600° C. by the temperature control means to be supplied to the fuel electrode.

The fuel may be ethanol, and the fuel supply means may supply ethanol to the power generating means. The supplied ethanol may be started to be reformed at a temperature below 450° C. and heated from about 450° C. to about 600° C. by the temperature control means to be supplied to the fuel electrode.

The fuel may be dimethyl ether, and the fuel supply means may supply dimethyl ether to the power generating means. The supplied dimethyl ether may be started to be reformed at a temperature below 450° C. and heated from about 450° C. to about 600° C. by the temperature control means to be supplied to the fuel electrode.

The fuel may be propane, and the fuel supply means may supply propane to the power generating means. The supplied propane may be started to be reformed at a temperature of about 300° C. and heated from about 450° C. to about 600° C. by the temperature control means to be supplied to the fuel electrode.

BRIEF DESCRIPTION OF THE DRAWINGS

In the drawings:

FIG. 11 is a perspective view of a gas channel of the fifth preferred embodiment of a fuel cell according to the present invention;

FIG. 12 is a perspective view of a fuel supplying portion of the firth preferred embodiment of a fuel cell according to the present invention;

FIG. 13 is a perspective view of a gas channel of the sixth preferred embodiment of a fuel cell according to the present invention;

FIG. 22 is a partially-sectioned perspective view of the eleventh preferred embodiment of a fuel cell according to the present invention.

DETAILED DESCRIPTION OF THE PREFERRED EMBODIMENTS

Referring now to the accompanying drawings, particularly to FIGS. 3 through 22, the preferred embodiments of a fuel cell, according to the present invention, will be described in detail below.

Figure 1:
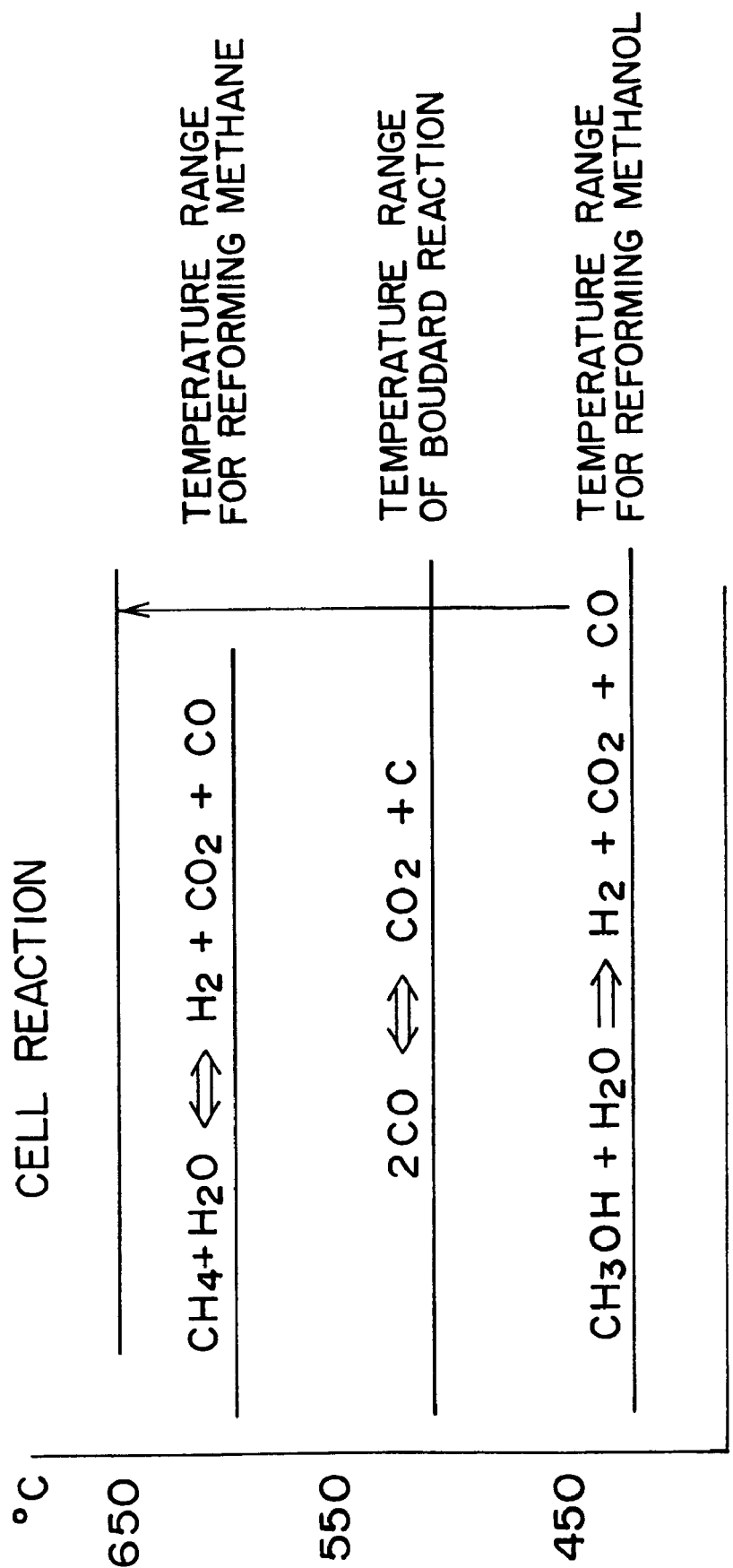
FIG. 1 is a graph showing the relationship between the cell reaction temperature and the reforming temperatures of methane and methanol.
Figure 2:
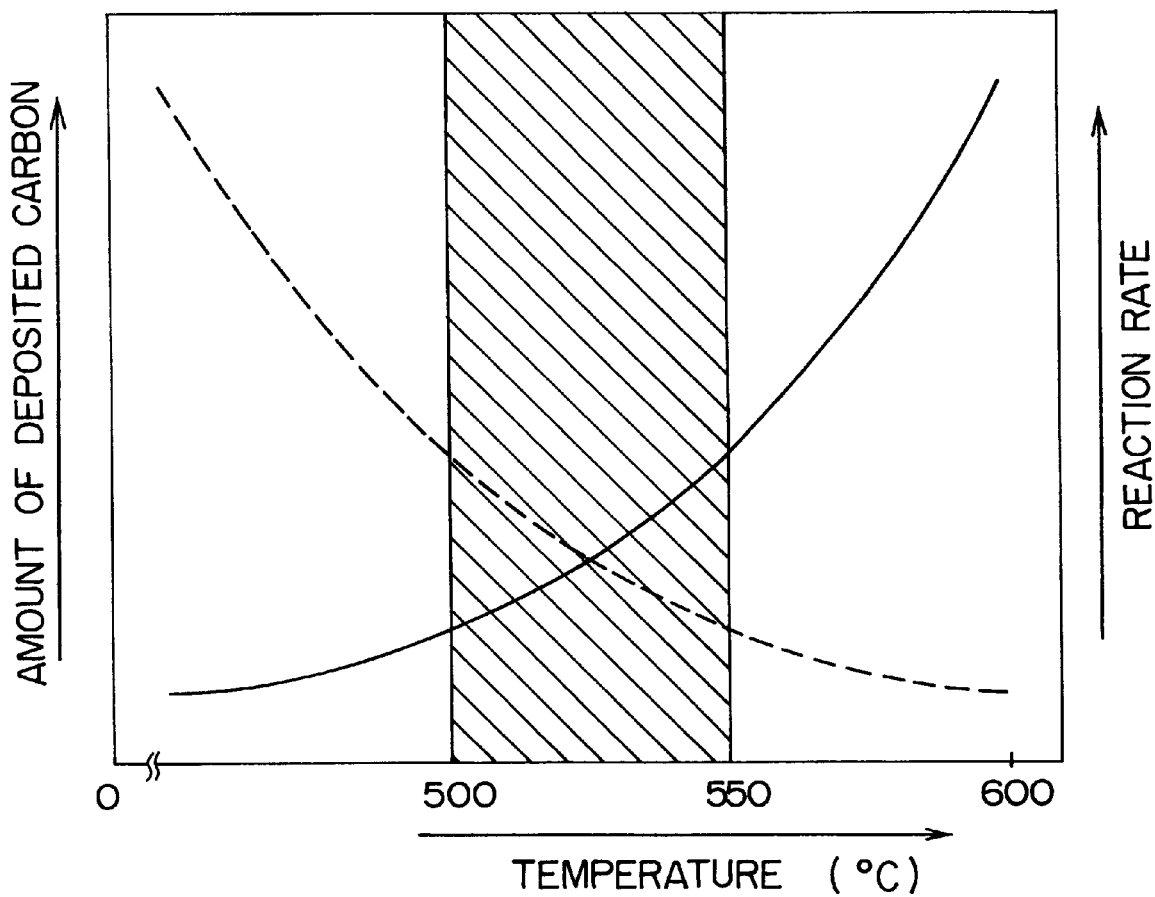
FIG. 2 is a graph showing the relationship between the chemical reaction rate and the amount of deposited carbon versus temperature.
Figure 3:
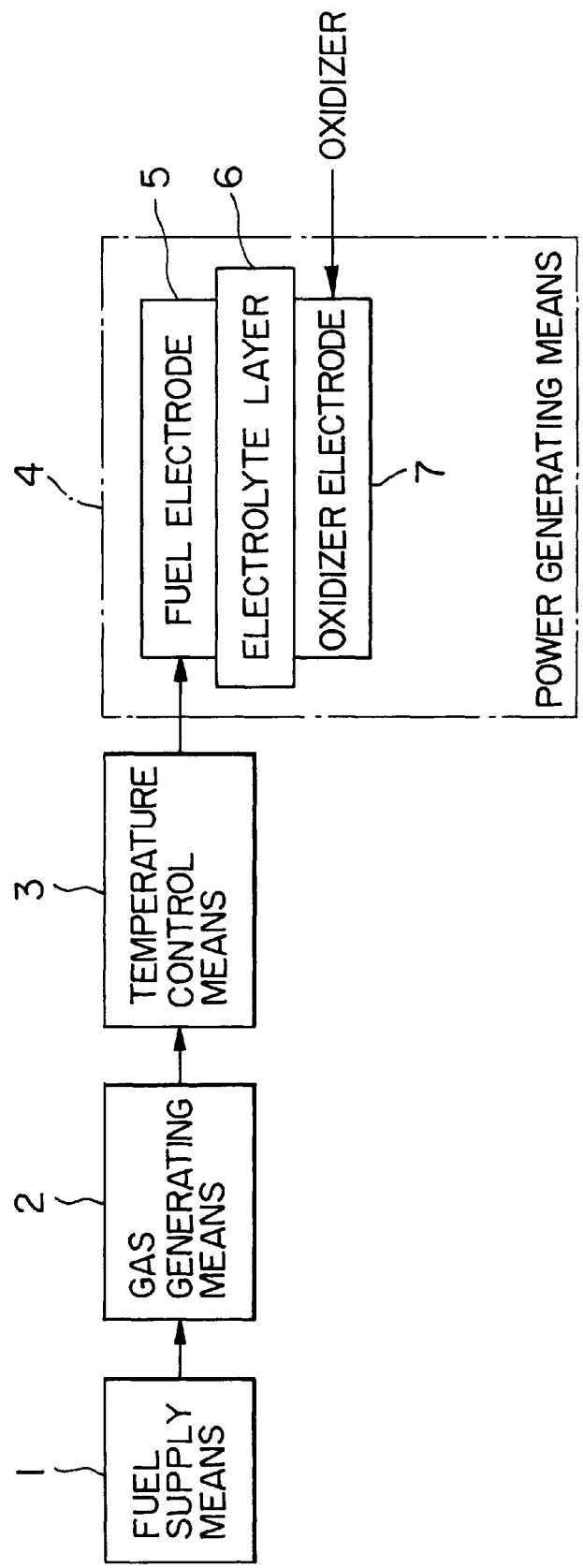
FIG. 3 is a block diagram of the first preferred embodiment of a fuel cell according to the present invention.

FIG. 3 is a block diagram illustrating a basic concept of the first preferred embodiment of a fuel cell according to the present invention. As shown in FIG. 3, the fuel cell comprises: fuel supplying means 1 for supplying a fuel having a lower reforming temperature than a first predetermined temperature; gas generating means 2 for reforming or decomposing the fuel supplied from the fuel supplying means 1 to generate a hydrogen containing gas which contains at least hydrogen; temperature control means 3 for rapidly raising the temperature of the hydrogen containing gas generated by the gas generating means 2 from a second predetermined temperature to a third predetermined temperature and for controlling the temperature of the hydrogen containing gas so as to maintain it at least at the third predetermined temperature; and generating means 4 having at least a pair of electrodes. The generating means 4 comprises at least a pair of electrodes, i.e., a fuel electrode 5, to which the temperature-controlled hydrogen containing gas is supplied, and an oxidizer electrode 7, which faces the fuel electrode via an electrolyte layer 6 and to which an oxidizer is supplied.

The first predetermine temperature of the fuel supplied from the fuel supplying means 1 is 450° C. The temperature control means 3 rapidly raises the temperature of the hydrogen containing gas from the second predetermined temperature of 300° C. to the third predetermined temperature of 600° C., and controls the temperature so as to maintain it at a temperature above the third predetermined temperature of 600° C. until the hydrogen containing gas is supplied to the fuel electrode 5. Since the temperature of the hydrogen containing gas is rapidly increased and control in the above manner, the deposition of carbon can be suppressed. Specifically, although the fuel is most preferably methanol because of easy manufacturing and storage, it may be ethanol, dimethyl ether, propane or the like, which have a reforming temperature below 450° C.

FIGS. 4 through 7, the second preferred embodiment of a fuel cell, according to the present invention, will be described below.

Figure 4:
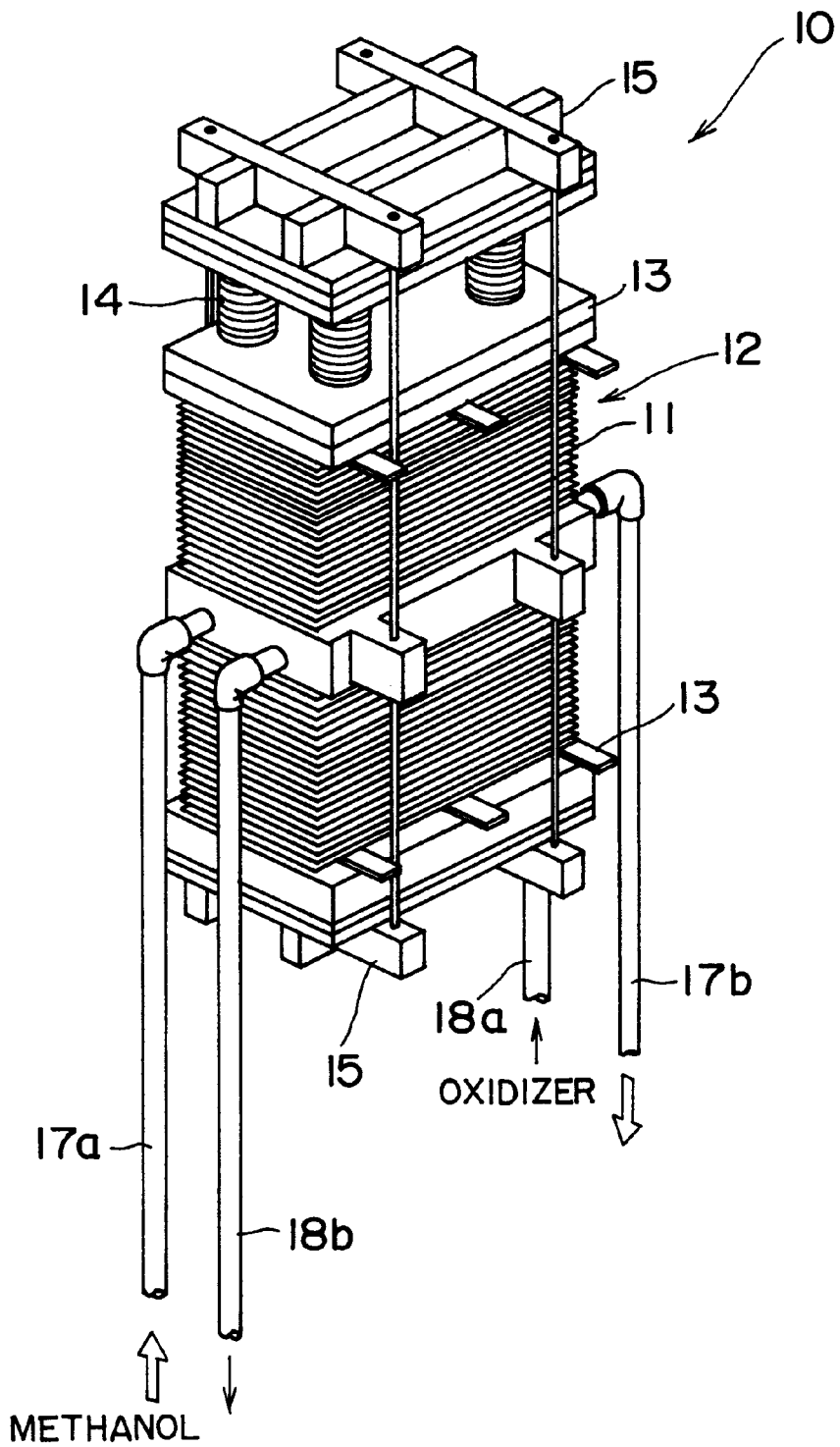
FIG. 4 is a perspective view of the second preferred embodiment of a fuel cell according to the present invention.

In FIG. 4, a laminated body 12 comprising a plurality of laminated single cells 11 is clamped by breakout electrodes 13. The single cells 11 forming the laminated body 12 are biased by springs 14, which are provided on one of the electrodes 13, so that the adjacent single cells 11 are brought into contact with each other by a predetermined contact force (face contact force). One ends of the springs 14 contact the electrode 13, and the other ends thereof contact a fixed portion 15, to which the springs 14 are fixed.

Figure 5:
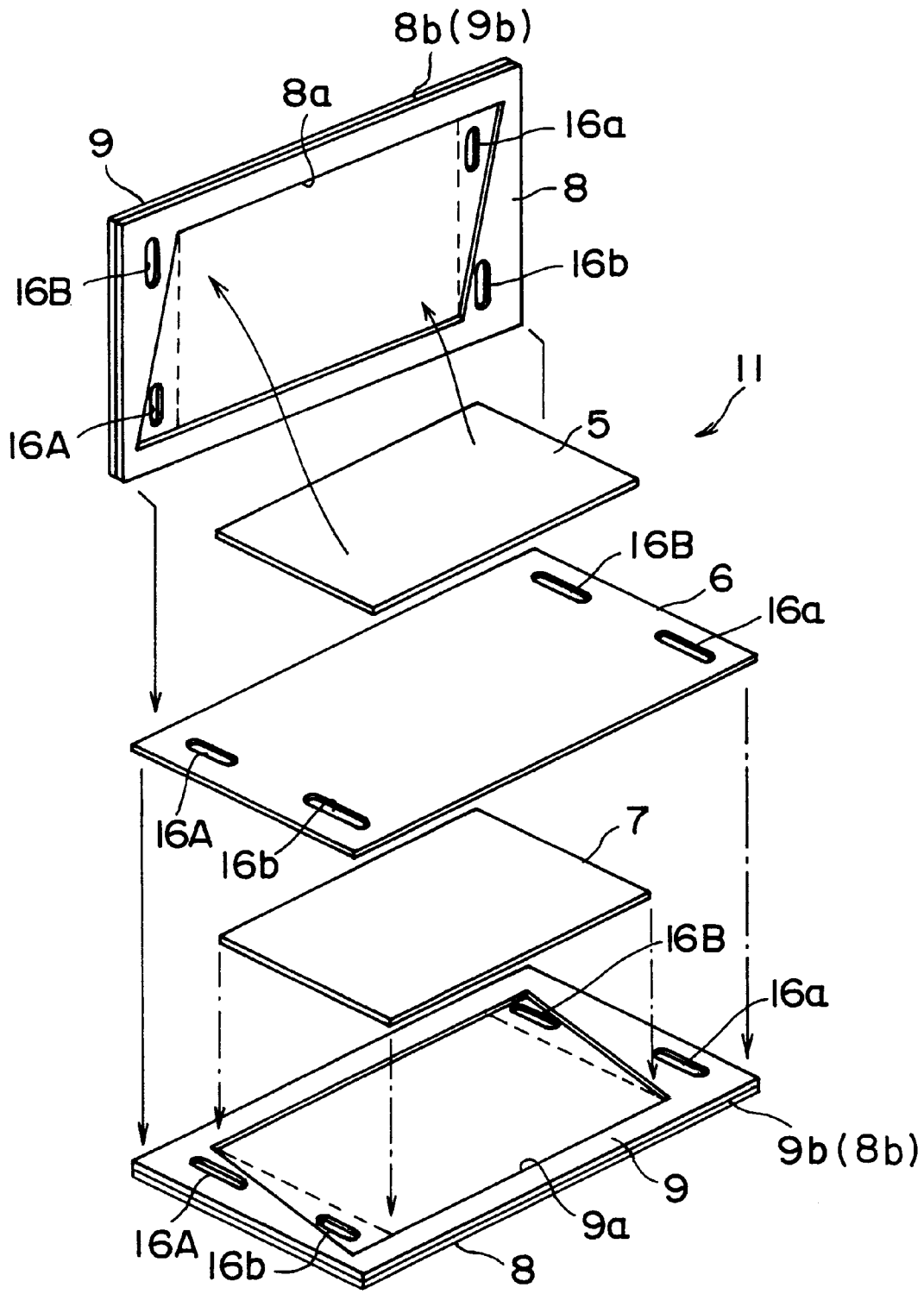
FIG. 5 is an exploded perspective view of a single cell shown in FIG. 4.

FIG. 5 is an exploded perspective view of one of the single cells 11 forming the laminated body 12. As shown in FIG. 5, each of the single cells 11 has a manifold 16 for allowing a fuel gas, such as methanol, and an oxidizer, such as air, to flow therethrough. The manifold 16 comprises a distributing portion, a first manifold and a second manifold, and is arranged so as to substantially face the manifold of the adjacent single cell 11. The fuel, such as methanol, is stored in a fuel tank (not shown). The oxidizer, such as air, is compressed by means of a compressor (not shown) to be supplied.

The fuel tank (not shown) is connected to the single cells 11, to which the fuel gas, such as methanol, and air or the like are supplied, by means of pipes 17a and 18a shown in FIG. 4 to supply the fuel gas and the oxidizer to the single cells 11. The fuel gas and the oxidizer, which were used for power generation, are collected by the pipes 17b and 18b.

Thus, the fuel cell body 10 comprises the plurality of single cells 11 (the laminated body 12), the electrodes 13, the springs 14, the fixed portion 15, the manifold 16 and the pipes 17a through 18b. Referring to FIG. 5, the details of the single cells 11 will be described below.

The electrolyte plate (electrolyte layer) 6 is clamped by the anode 5 serving as the fuel electrode and the cathode 7 serving as the oxidizer electrode to form a pair of electrodes. The electrolyte plate 6 is formed with the manifold 16, through which the fuel gas and oxygen (usually air) flow. Separators 8 and 9 of stainless are provided so as to face the anode 5 and the cathode 7 on the opposite sides of the electrolyte plate 6. The separators 8 and 9 are formed with manifolds 16, which allow the fuel gas and oxygen to pass therethrough, so as to corresponds to the manifolds 16 of the electrolyte plate 6. Gas channels 8a and 9a, through which the fuel gas and oxygen pass, are formed in the separators 8 and 9 on the sides, on which the separator 8 contacts the anode 5 and the separator 9 contacts the cathode 7. Inter connectors 8b and 9b are inserted into the separators 8 and 9.

The gas channels 8a and 9a comprise manifolds 16A and 16a for fuel, which are two of the four manifolds 16 formed on both ends of the separators 8 and 9 and which are arranged on a diagonal of each of the separators 8 and 9. Manifolds 16B and 16b are also formed in the separators 8 and 9 on another diagonal thereof. Therefore, the fuel, such as methanol, is supplied via the manifold 16A and discharged via the manifold 16a, whereas the oxidizer, such as compressed air, is supplied via the manifold 16B and discharged via the manifold 16b.

For explanatory convenience, while the construction of a single side of each of the upper and lower laminated separators 8 and 9 has been described in detail, the separators 8 and 9 may be formed on both sides of a single plate between the adjacent single cells 11. In this case, the inter connectors 8b and 9b are the same element.

With this construction, the operation of the second preferred embodiment of a fuel cell, according to the present invention, will be described below.

The separators 8, 9 and the electrolyte plate 6 are sealed and brought into tight contact with each other by means of a wet seal at a predetermined temperature under a predetermined pressure. Methanol (fuel) is supplied from the fuel tank (not shown) to the gas channel 8a via the pipe 17a and the manifold 16A, and air pressurized by the compressor is supplied from atmosphere to the gas channel 9a via the pipe 18a and the manifold 18B. Thus, methanol and oxygen (air) serving as the oxidizer are separately supplied to the gas channels 8a and 9a via the separate manifolds 16A and 16B.

Figure 6:
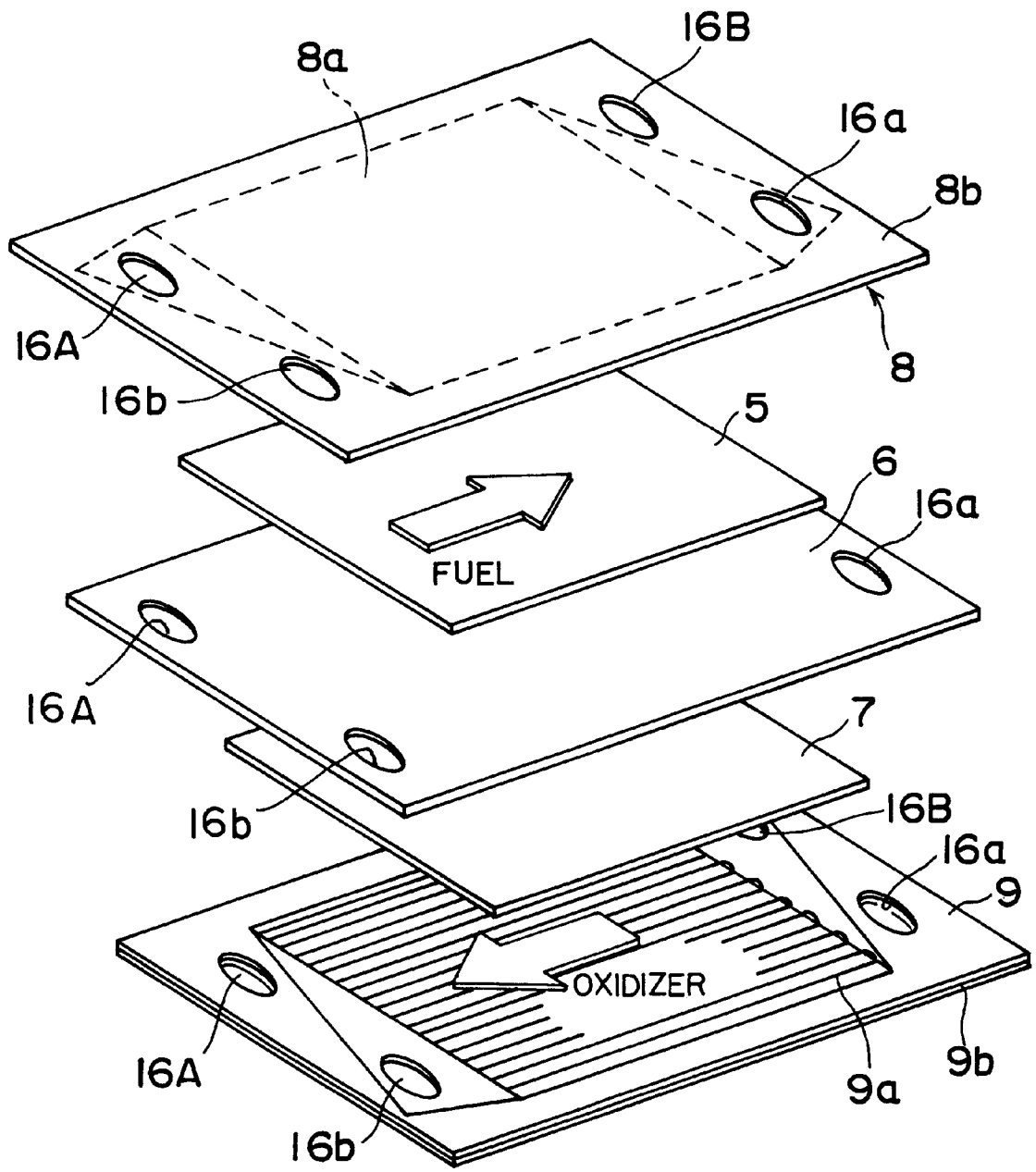
FIG. 6 is a detailed, exploded perspective view of the single cell of the second preferred embodiment of a fuel cell according to the present invention.

Referring to FIG. 6, the operation will be described below. For example, if methanol is supplied from the manifold (first manifold) 16A of the separator 8, oxygen is supplied from the manifold (second manifold) 16B of the separator 9 (which faces the reverse surface of the separator 8 via the inter connector 8b). That is, methanol and oxygen are not mixed in the same separator 8 or 9. Methanol supplied from the manifold 16A to the gas channel 8a of the separator 8 is reformed into a reforming gas represented by the following formula (4), while flowing through the gas channel 8a (shown by the dotted line).

$$CH_3OH + H_2O \rightarrow 3H_2 + CO_2 \tag{4}$$

The reforming gas and unreacted methanol are discharged to the outside of the separator 8 via the manifold 16a. The manifolds 16A and 16a are arranged on the both ends of the diagonal. Similarly, oxygen supplied from the manifold 16B to the gas channel 9a of the separator 9 flows through the gas channel 9a to the manifold 16b to be collected. The collected oxygen is heated to a predetermined temperature by means of a high-temperature floor to be supplied from the manifold 6B again. On the cathode 7, the chemical reaction represented by the following formula (5) occurs between the supplied oxygen and carbon dioxide contained in air, to generate carbonate ion.

$$(1/2)O_2 + CO_2 + 2e^- \rightarrow CO_3^{2-} \tag{5}$$

On the other hand, on the anode 5, hydrogen in the reforming gas, which is obtained by reforming the supplied methanol, reacts with the carbonate ion, which is obtained by the chemical reaction on the cathode 7, to generate water, carbon dioxide and electron (the following formula (6)).

$$H_2 + CO_3^{2-} \rightarrow H_2O + CO_2 + 2e^- \tag{6}$$

The carbon dioxide generated on the anode 5 and collected after reaction is supplied to the cathode 7. The electrons generated on the anode 5 are repeatedly supplied to a circuit (not shown) via the breakout electrodes 13, so that electric current flows through the circuit to generate electric power.

In the second preferred embodiment as described above, since the manifolds 16 are formed in the separators 8 and 9, the heat generated by power generation (exothermic reaction) can be used for the thermal insulation of the manifold 16, so that the temperature does not reach the temperature range (from 500° C. to 550° C.) at which carbon is deposited. Therefore, in the second preferred embodiment, the temperature control means is the fuel supplying passage, such as the manifolds formed in the separators. Thus, it is possible to inhibit carbon from being deposited, so that it is possible to generate electricity for a long time without decreasing the generating efficiency.

The temperature of the peripheral portion of the manifold 16b of the separator 9 for discharging the oxidizer is raised by the heat, which is generated in the single cells 11 by power generation and which propagates with the flow of the oxidizer. However, the manifold 16A for supplying methanol (or the discharging manifold) and the manifold 16b for discharging the oxidizer (or the supplying manifold 16B) are formed on the side of the same end portion so as to be in close to each other. Therefore, the heat generated by power generation is absorbed since the reforming reaction is an endothermic reaction, so that it is possible to obtain a uniform temperature distribution in the single cells 11 at a desired temperature. Thus, it is possible to generate the cell reaction (power generation) in the whole single cells 11 by obtaining the uniform temperature distribution in the single cells 11, so that it is possible to obtain a uniform current density distribution to improve the generating efficiency.

Figure 7:
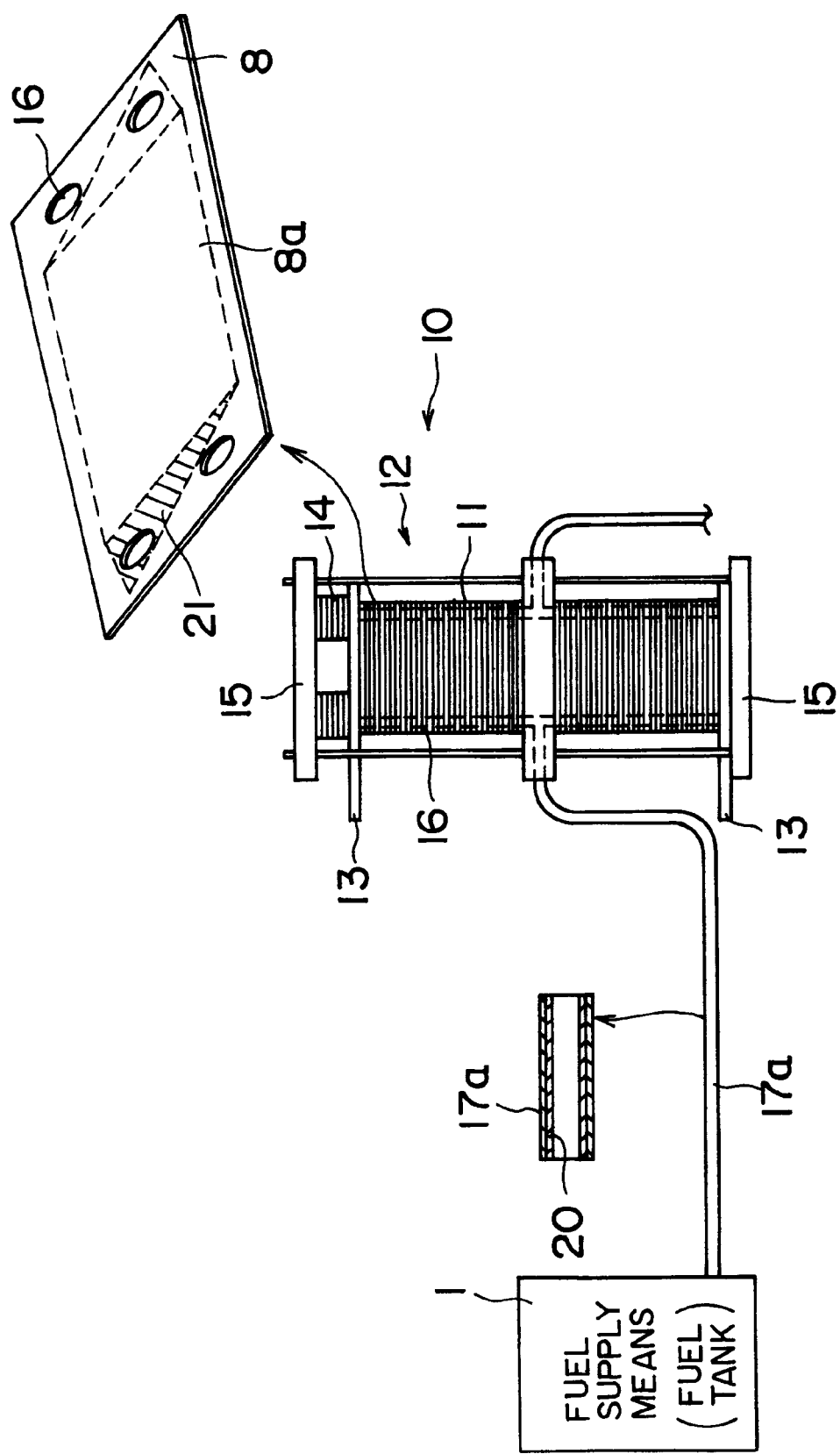
FIG. 7 is a side view of the third preferred embodiment of a fuel cell according to the present invention.

Referring to FIG. 7, the third preferred embodiment of a fuel cell, according to the present invention, will be described below. In the undermentioned preferred embodiments, the same reference numbers as those in the first and second preferred embodiments are used, and the duplicate descriptions are omitted. The feature of the third preferred embodiment is that the inner walls of a pipe 17 and manifolds 16 are coated by boron nitride or the like to prevent the reforming of methanol.

FIG. 6 is a side view of the third preferred embodiment of a fuel cell according to the present invention. A pipe 17a is connected to a fuel tank 1 for storing methanol serving as a fuel. The pipe 17a is connected to a single cell 11 via a manifold 16. In order to inhibit methanol flowing through the pipe 17a from contacting a reforming catalyst which reforms the fuel such as methanol, a coating 20 is formed at least on the inner wall of the pipe 17a by the surface treatment of boron nitride or the like. This surface treatment may be carried out by using ceramic thermal spraying or coating an oxide such as iron oxide.

The same coatings 20 are formed on the surface of the manifold 16, a separator 8 forming a laminated body 12, a gas channel 8a, a gas introducing portion 21 (a portion in the gas channel 8a of the separator 8 represented by the slanting lines in FIG. 7), an inter connector inserted into the separator 8 and so forth, so that it is possible to obtain more superior effects.

In the third preferred embodiment as described above, methanol is supplied to the single cell 11 while inhibiting the reforming reaction of methanol before methanol is supplied to the separator 8, and reformed in the separator 8, so that it is possible to improve the generating efficiency. In addition, the heat generated by the exothermic reaction can be removed by the endothermic reaction, so that the temperature in the separator 8 can be uniformly maintained at a desired temperature required for power generation. Therefore, it is possible to provide a fuel cell which can operate for a long time.

Figure 8:
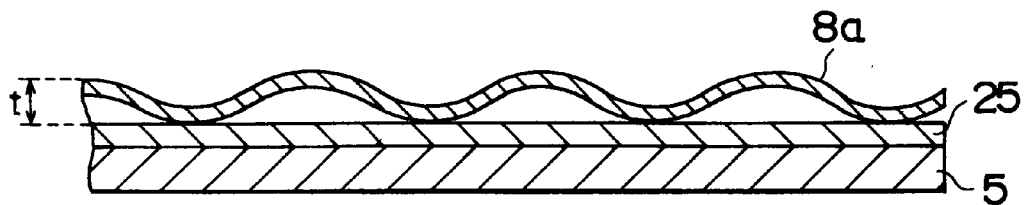
FIG. 8 is a sectional view of the peripheral portion of a gas channel of the fourth preferred embodiment of a fuel cell according to the present invention.
Figure 9:
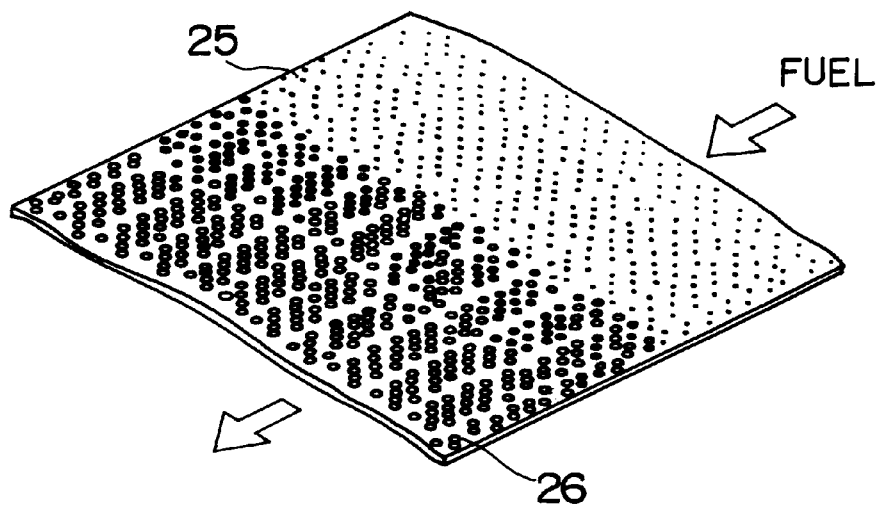
FIG. 9 is a perspective view of an embodiment of a fuel supplying portion of the fourth preferred embodiment of a fuel cell according to the present invention.
Figure 10:
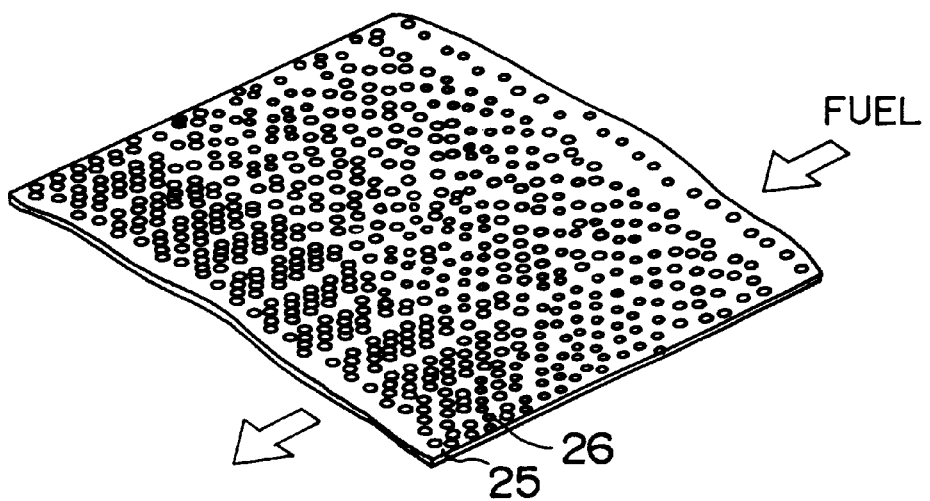
FIG. 10 is a perspective view of another embodiment of a fuel supplying portion of the fourth preferred embodiment of a fuel cell according to the present invention.

Referring to FIGS. 8 through 10, the fourth preferred embodiment of a fuel cell, according to the present invention, will be described below.

The feature of the fourth preferred embodiment is that the amount of a reforming gas supplied to a separator 8 is adjusted to uniformly maintain the temperature by changing the rate of hole area of fuel supply ports 26 per unit area formed in a fuel supplying portion 25.

FIG. 8 is a sectional view of the peripheral portion of a gas channel of the fourth preferred embodiment of a fuel cell according to the present invention, and FIGS. 9 and 10 are perspective views of the fuel supplying portion 25 of the fourth preferred embodiment of a fuel cell according to the present invention. In FIGS. 9 and 10, arrows show the flowing direction of a fuel (methanol).

The fuel supplying portion 25 of, e.g., SUS (Steel, Special Use, Stainless), is formed on an anode 5. The fuel supplying portion 25 is provided with a gas channel 8a having a corrugated cross section. The fuel supplying portion 25 has the fuel supply ports 26 as shown in FIGS. 9 and 10. The rate of hole area of the fuel supply ports 26 per unit area on the supply side, on which the fuel is supplied to the anode 5, (the upstream portion in the flowing direction of the fuel) is smaller than that on the discharged side, on which the fuel is discharged (the downstream portion in the flowing direction of the fuel). For example, the diameter of each of the fuel supply ports 6 is changed (see FIG. 9), or the number of the fuel supply ports 6 is changed (see FIG. 10).

With this construction, the operation of the fourth preferred embodiment of a fuel cell, according to the present invention, will be described. The gas channel 8a is a passage for supplying the fuel to the anode 5. The fuel supplying portion 25 serves to prevent the gas channel 8a from excessively penetrating in the anode 5. The fuel guided by the gas channel 8a is supplied to the anode 5 through the fuel supply ports 26 of the fuel supplying portion 25. Although the amount of the fuel supplied through the upstream fuel supply ports 26 is smaller since the upstream fuel supply ports have a smaller rate of hole area per unit area, the amount of the fuel supplied through the downstream fuel supply ports 26 is larger because the rate of hole area increases as approaching the downstream.

In the fourth preferred embodiment as described above, it is possible to uniformly supply the fuel to the whole anode 5 by changing the shapes of the fuel supply ports 26. Therefore, it is possible to obtain a uniform current density distribution to increase the generating efficiency. In addition, since the reforming reaction for converting the fuel to the reforming gas occurs in the single cell 11, the heat generated by the generating reaction can be absorbed by the endothermic reaction when the reforming reaction occurs, so that the temperature distribution in the signal cell 11 can be uniformly maintained. In addition, by decreasing the upstream rate of hole area, it is possible to prevent the exothermic reaction (due to the reforming reaction) from excessively occurring to decrease the temperature to a temperature range (from 500° C. to 550° C.), at which carbon is deposited, to inhibit the endothermic reaction.

In addition, if the height t of the gas channel 14 is in the range of from 0.2 mm to 10 mm, the flow velocity of the fuel flowing through the gas channel 8a is optimum, so that the generating efficiency can be improved. The lower and upper limits of the height t are determined to be optimum values on the basis of the pressure loss and the size of the fuel cell body 10 (the laminated direction and height of the laminated body 12), respectively.

Moreover, if the thickness of the coating of boron nitride or the like formed on the surface of the gas channel 8a is gradually decreased from the upstream side, to which the fuel is supplied, to the downstream side, from which the fuel is discharged, it is possible to allow the reforming reaction to effectively occur in the single cell 11. In addition, the fuel cell can operate for a long time.

Referring to FIGS. 11 and 12, the fifth preferred embodiment of a fuel cell, according to the present invention, will be described below. The feature of the fifth preferred embodiment is that a plurality of fuel inflow portions 30 for supplying the fuel from the gas channels 8a to the anode 5 are provided so as to be stepped in the fuel flowing direction to uniformly maintain the current density and temperature distribution. FIG. 11 is a perspective view of gas channels of the fifth preferred embodiment of a fuel cell according to the present invention, and FIG. 12 is a perspective view of a fuel supplying portion of the fifth preferred embodiment of a fuel cell according to the present invention.

A fuel supplying portion 25 having fuel supply ports 26 of substantially the same size is provided on an anode 5. A plurality of gas channels 8a are provided on the fuel supplying portion 25. Each of the gas channels 8a has a plurality of fuel inflow portions 30 and is formed so that the opening areas are gradually increased from the upstream side, into which the fuel supplied to the anode 5 flows, to the downstream side, from which the fuel is discharged. The gas channel 8a has a minimum opening 30a, into which the fuel is introduced. To the minimum opening 30a, an intermediate opening 30b having an opening area twice as large as that of the minimum opening 30a is connected. To the intermediate opening 30b, a final opening 30c having an opening area one and a half times as large as that of the intermediate opening 30b is connected.

With this construction, the operation of the fifth preferred embodiment of a fuel cell, according to the present invention, will be described. First, a part of the fuel introduced from the minimum opening 30a is supplied from the fuel supply ports 26 formed in the fuel supplying portion 25 to the anode 5. Thereafter, the rest of the fuel, which is not introduced into the minimum opening 30a, flows to the downstream of the fuel. Then, a part of the rest of the fuel is supplied, via the intermediate opening 30b, from the fuel supply ports 26 formed in the fuel supplying portion 25 to the anode 5. Finally, the rest of the fuel, which is not introduced into the minimum opening 30a and the intermediate opening 30b, is supplied, via the final opening 30c, from the fuel supply ports 26 formed in the fuel supplying portion 25 to the anode 5. Thus, the amount of the fuel supplied to the anode 5 increases as approaching the downstream side.

In the fifth preferred embodiment as described above, it is possible to uniformly supply the fuel to the anode 10 by providing the fuel inflow portion 30 wherein the gas channel 8a has a plurality of openings having different opening areas, into which the fuel is introduced, so that the temperature distribution of the anode 10 can be uniform. Therefore, the current density distribution can be uniform to increase the generating efficiency of the fuel cell, so that the life of the fuel cell can be increased.

While the number of the openings of the fuel inflow portion 30 has been three in the fifth preferred embodiment, it may be at least two or more. In addition, the size of the fuel inflow portion 30 may be different, not the same, under various conditions.

Referring to FIG. 13, the sixth preferred embodiment of a fuel cell, according to the present invention, will be described below. The feature of the sixth preferred embodiment is that a plurality of corrugated gas channels 8a (8a1, 8a2) are formed on a fuel supplying portion 25 so that the crest portions 31 and valley portions 32 of the gas channels 8a1 and 8a2 are lapped over, respectively, to improve the generating efficiency of the fuel cell by supplying a fuel to the whole anode 5. FIG. 13 is a perspective view showing gas channels of the sixth preferred embodiment of a fuel cell according to the present invention. In FIG. 13, the arrow shows the fuel flowing direction.

The fuel supplying portion 25 is provided on the anode 5. The fuel supplying portion 25 has fuel supply ports 26. The sizes of the fuel supply ports 26 may be either the same or different. A plurality of gas channels 8a (8a1, 8a2) having, e.g., a corrugated cross section, are formed on the fuel supplying portion 25. Each of the gas channels 8a has crest portions 31 and valley portions 32. The adjacent gas channels 8a1 and 8ab are arranged in series in the fuel flowing direction so that the crest portions 31a and the valley portions 32 are lapped over, respectively.

With this construction, the operation of the sixth preferred embodiment of a fuel cell, according to the present invention, will be described. The fuel is supplied to the gas channel 8a1 to be introduced into the anode 5 through gaps between the crest portions 31a and the fuel supplying portion 26. On the other hand, the fuel flowing through the valley portions 32 of the gas channel 8a1 is not supplied from the gas channel 8a1 to the anode 5, and flows into the anode 5 through gaps between the crest portions 31b of the gas channel 8a2 and the fuel supplying portion 25.

In the sixth preferred embodiment as described above, since the fuel can be uniformly supplied to the whole anode 5, the temperature distribution can be uniform at a desired temperature. Therefore, the current density distribution can be uniform, so that the generating efficiency of the fuel cell can be improved. Moreover, the life of the fuel cell can be increased.

Figure 14:
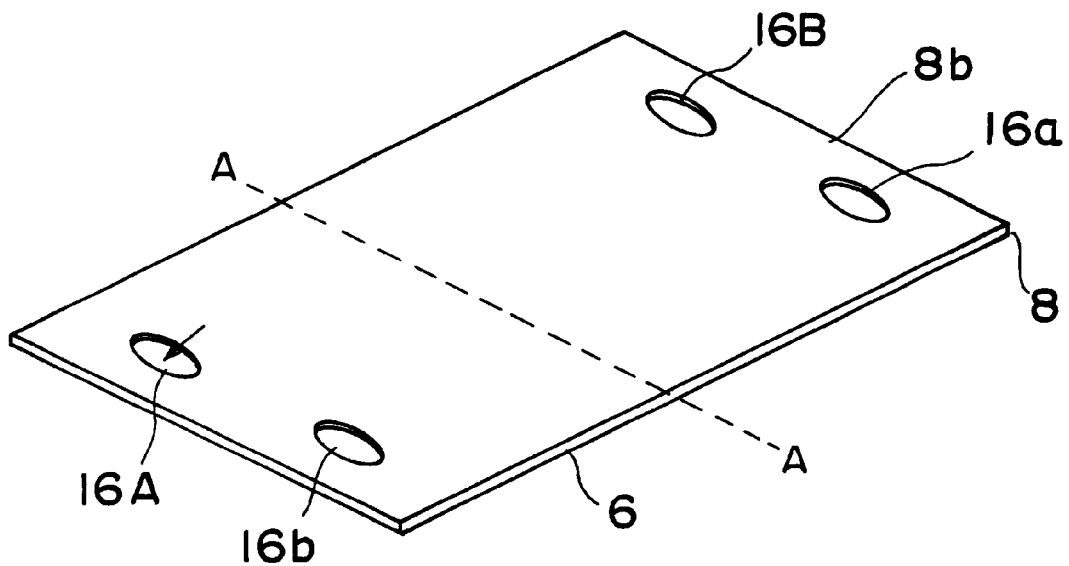
FIG. 14 is a perspective view of the peripheral portion of a gas channel of the seventh preferred embodiment of a fuel cell according to the present invention.
Figure 15:
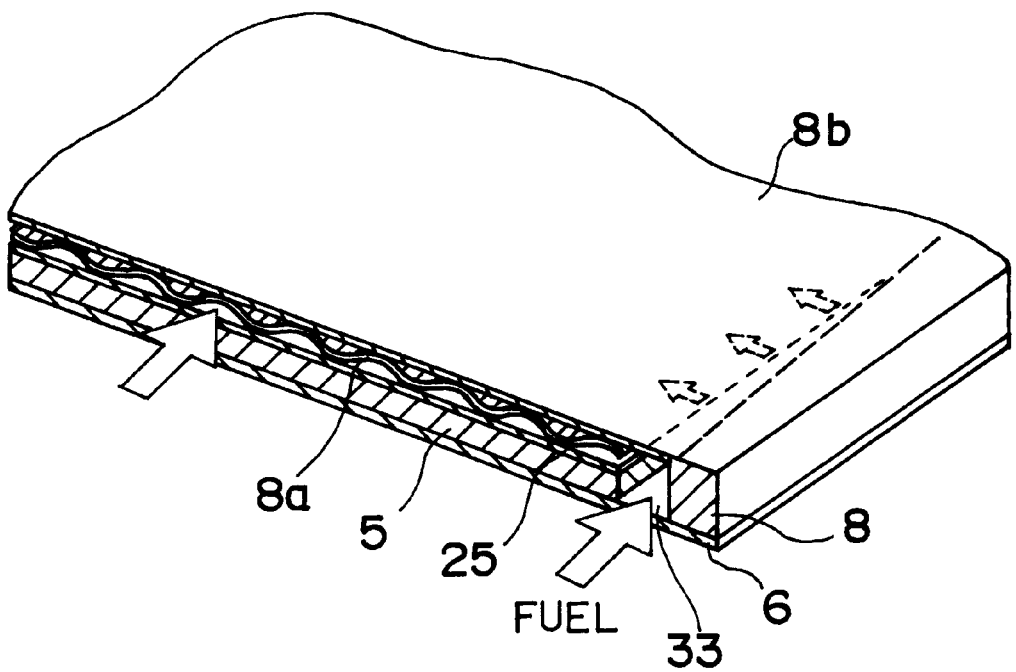
FIG. 15 is a partially-sectioned perspective view of the peripheral portion of the gas channel of the seventh preferred embodiment of a fuel cell according to the present invention.

Referring to FIGS. 14 and 15, the seventh preferred embodiment of a fuel cell, according to the present invention, will be described below. The feature of the seventh preferred embodiment is that a fuel is supplied from the periphery of a gas channel to improve the generating efficiency.

FIG. 14 is a perspective view showing the periphery of a gas channel of the seventh preferred embodiment of a fuel cell according to the present invention, and FIG. 15 is a sectional view taken along line A—A of FIG. 14. In FIG. 15, the arrow shows the fuel flowing direction.

A gas channel 8a, a fuel supplying portion 25 and an anode 5 are laminated. The gas channel 8a, the fuel supplying portion 25 and the anode 5, together with a separator 8, clamped by an inter connector 8b and an electrolyte plate 8. The gas channel 8a, the fuel supplying portion 25 and the anode 5 are arranged so as to be apart from the separator 8 by a gap 33. The width of the gap 33 decreases as approaching the downstream of the fuel flowing direction.

With this construction, the operation of the seventh preferred embodiment will be described. The fuel (the arrow shown by the solid line) supplied from a manifold 16 to the gas channel 8a is supplied to the anode through the gaps between the crest portions of the gas channel 8a and the fuel supplying portion 25. At this time, the fuel supplied from the gap 33 flows in a plane perpendicular to the direction, in which the anode 5, the fuel supplying portion 25 and the gas channel 8a are laminated on the gas channel 8a (in the direction perpendicular to the fuel flowing direction), to be supplied to the anode 5 (the arrow shown by the dashed line). Since the gap 33 decreases gradually, the fuel is substantially uniformly supplied from the side of the gas channel 8a regardless of the upstream and downstream sides, to which the fuel is supplied to the gas channel 8a.

In the seventh preferred embodiment as described above, the fuel is not only supplied from the upstream side, but it is also supplied from the downstream side. Therefore, it is possible to obtain a uniform temperature distribution on the whole anode 5 and a uniform current density distribution, so that the generating efficiency of the fuel cell can be improved and the life of the fuel cell can be increased.

Figure 16:
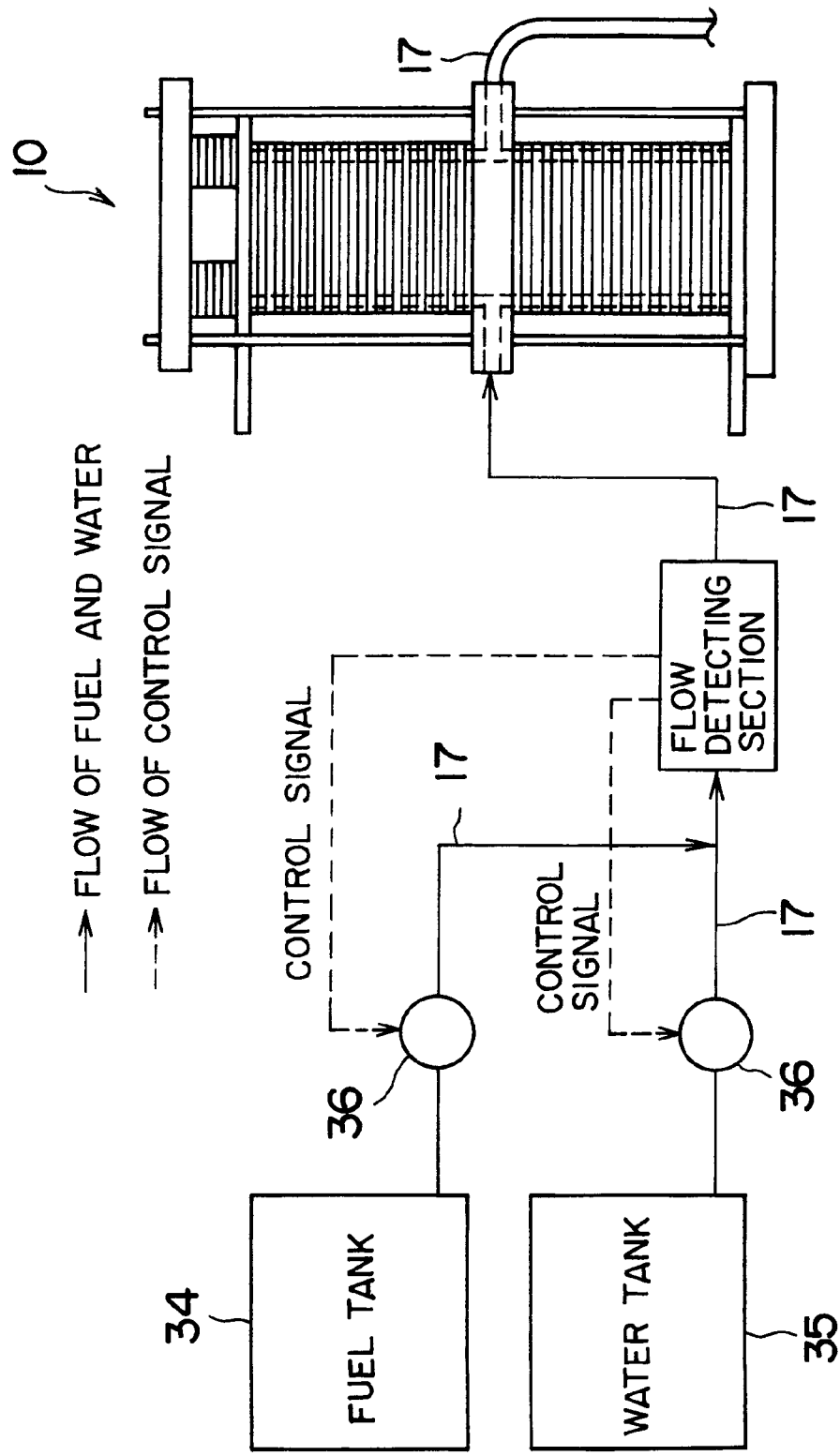
FIG. 16 is a block diagram of an inflow control system of the eighth preferred embodiment of a fuel cell according to the present invention.

Referring to FIG. 16, the eighth preferred embodiment of a fuel cell, according to the present invention, will be described below. The feature of the eighth preferred embodiment is that the flow rates of a fuel and water supplied to a fuel cell body 10 are detected and controlled to improve the generating efficiency of the fuel cell.

FIG. 16 is a block diagram of a flow control system of the eighth preferred embodiment of a fuel cell according to the present invention. The fuel such as methanol is stored in a fuel tank 34, and water is stored in a water tank 35. The fuel tank 34 and the water tank 35 are connected to a flow detecting section 37 via pipes 17. The flow detecting section 37 is connected to the fuel cell body 10 via a pipe 17. Between the fuel tank 34 and the flow detecting section 37, a flow controller 36, such as a valve for controlling the flow rate of the fuel, is provided. Between the water tank 35 and the flow detecting section 37, a flow controller 36, such as a valve for controlling the flow rate of water, is provided. The fuel cell body 10 and the pipes 17 are provided with thermocouples (not shown).

With this construction, the operation of the eighth preferred embodiment of a fuel cell, according to the present invention, will be described. The fuel from the fuel tank 34 and water (steam) from the water tank 35 are supplied to the fuel cell body 10 through the pipes 17. The flow detecting section 37 detects a mixing ratio of the fuel to water. When the temperatures of the fuel cell body 10 and the pipes 17 measured by the thermocouples are within or near a temperature range, in which carbon is deposited, control signals are fed from the flow detecting section 37 to the respective flow controller 36 to adjust the flow rate of the fuel or water. When the temperature of the fuel cell body 10 is beyond the temperature range, in which carbon is deposited, the mixing ratio of water and the fuel is sequentially adjusted to a desired value.

In the eighth preferred embodiment as described above, the mixing ratio of the fuel and water (steam) is detected to control the amount of the fuel or water, so that the deposition of carbon can be inhibited (the temperature range does not reach the range of from 500° C. to 550° C.). Therefore, the fuel cell can operate for a long time. In addition, the temperatures of the fuel cell body 10 and the pipes 17 can be controlled so as to be maintained at a desired temperature range (at least 550° C.) by changing the flow rates of the fuel and water.

Figure 17:
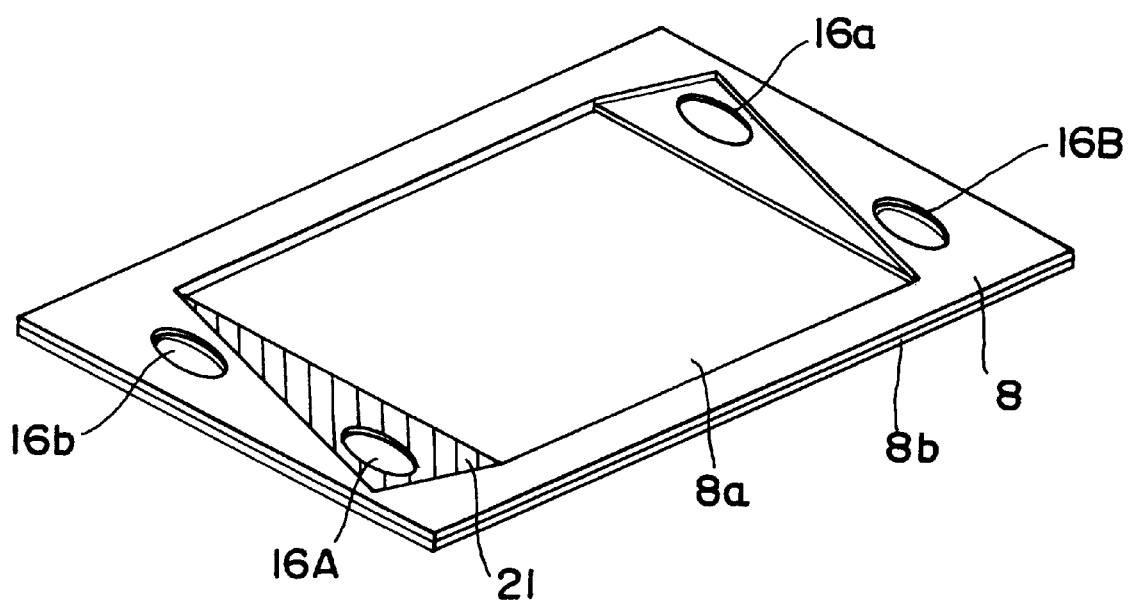
FIG. 17 is a perspective view of the peripheral portion of a gas introducing portion of the ninth preferred embodiment of a fuel cell according to the present invention.

Referring to FIG. 17, the ninth preferred embodiment of a fuel cell, according to the present invention, will be described below. The feature of the ninth preferred embodiment is that a reforming reaction being an endothermic reaction occurs at a gas introducing portion 21 to generate a hydrogen containing gas to absorb heat near an oxidizer discharging port to increase the generating efficiency of the fuel cell.

FIG. 17 is a perspective view of the periphery of a gas introducing portion of the ninth preferred embodiment of a fuel cell according to the present invention. A gas introducing portion 21 (shown by the slanting lines in FIG. 17) for dispersing and supplying a fuel from a manifold 16A to a gas channel 8a is formed so that the contact area with the fuel is different in order to promote the reforming reaction. For example, the gas introducing portion 21 is surface-treated to inhibit the reforming reaction, and formed by shaving the surface by means of a file such as a sand paper. The gas introducing portion 21 is of a ribbed anode or a material containing a great amount of a metal serving as a reforming catalyst (e.g., platinum, nickel). The gas introducing portion 21 may have a straightening vane having a passage, through which a reforming flows.

With this construction, the operation of the ninth preferred embodiment of a fuel cell, according to the present invention, will be described. The fuel such as methanol is supplied from the manifold 16A to the gas channel 8a while being dispersed in the gas introducing portion 21. In the gas introducing portion 21, the methanol fed from the fuel tank is reformed to be converted into a hydrogen containing reforming gas. Thereafter, the reforming gas is supplied to the anode 5 through the gas channel 8a. The unreacted reforming gas is discharged from the manifold 16a.

In the ninth preferred embodiment as described above, since the reforming reaction of the fuel is carried out in the gas introducing portion 21, the heat around the manifold 16b, from which the high-temperature oxidizer is discharged, is absorbed and cooled. Because the reforming reaction is an endothermic reaction to decrease the temperature of the oxidizer passing through the gas channel. Therefore, the temperature range can be uniformly maintained at a desired value without providing locally different temperatures in the separator 8. For that reason, the current density distribution in the separator 8 can be uniform, so that the generating efficiency of the fuel cell can be improved.

Referring to FIGS. 18 through 21, the tenth preferred embodiment of a fuel cell, according to the present invention, will be described below. The feature of the tenth preferred embodiment is that a pipe 41, through which a reforming gas flows to be supplied to a fuel cell body 10, is directly or indirectly provided in the fuel cell body 10 to preheat the fuel cell body 10 or maintain the temperature of the fuel cell body 10 at a predetermined temperature.

Figure 18:
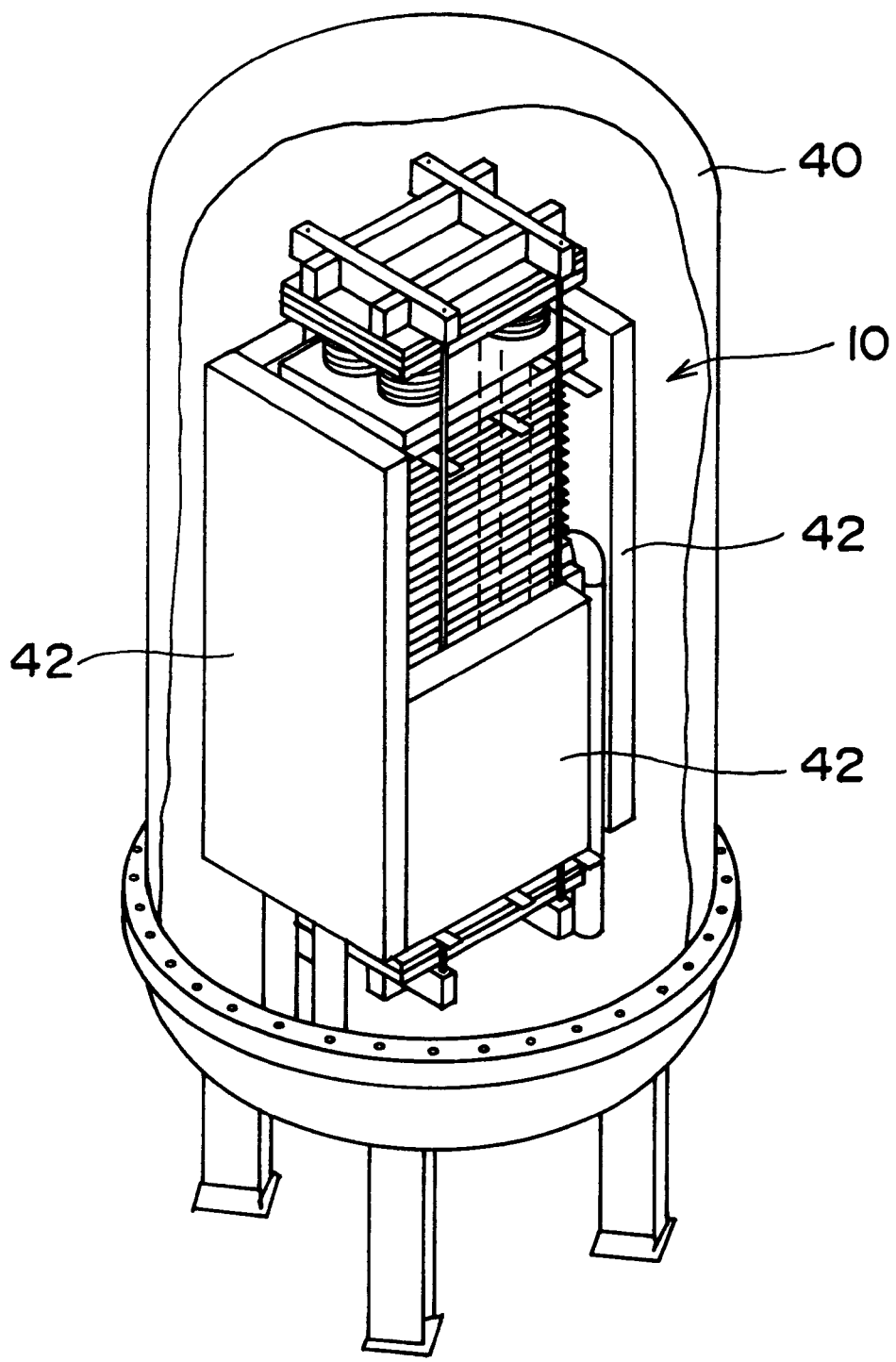
FIG. 18 is a partially-sectioned perspective view of the tenth preferred embodiment of a fuel cell according to the present invention.
Figure 19:
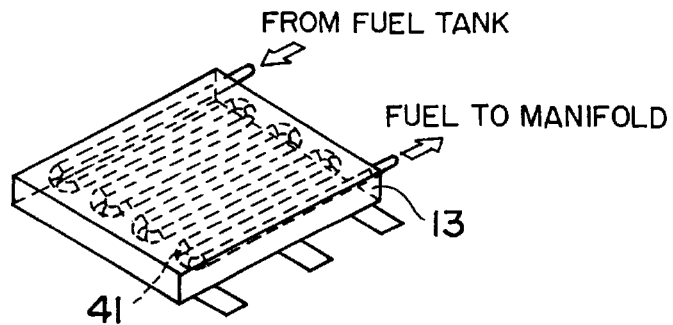
FIG. 19 is a perspective view illustrating an embodiment of a pipe of the tenth preferred embodiment of a fuel cell according to the present invention.
Figure 20:
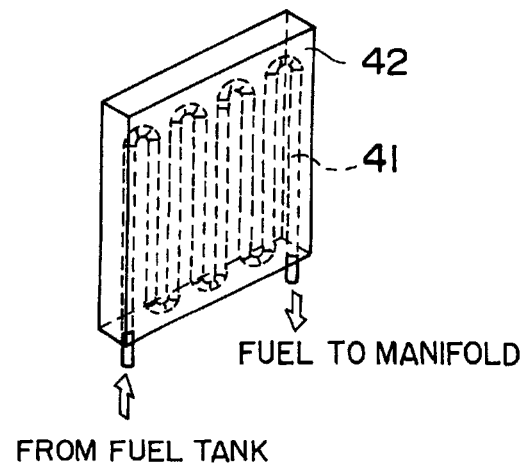
FIG. 20 is a perspective view illustrating another embodiment of a pipe of the tenth preferred embodiment of a fuel cell according to the present invention.
Figure 21:
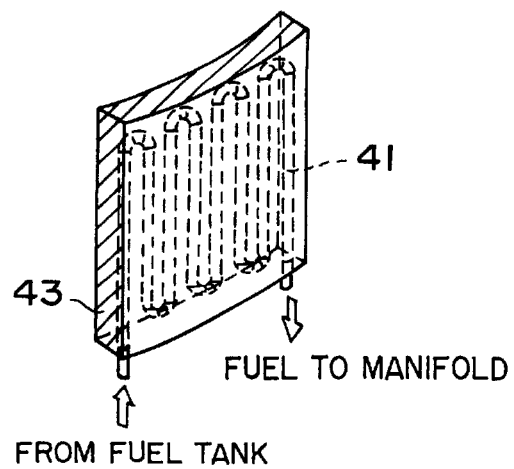
FIG. 21 is a perspective view illustrating further embodiment of a pipe of the tenth preferred embodiment of a fuel cell according to the present invention.

FIG. 18 is a partially-sectioned perspective view of the tenth preferred embodiment of a fuel cell according to the present invention, and FIGS. 19 through 21 are perspective views showing a pipe in the tenth preferred embodiment of a fuel cell according to the present invention.

The fuel cell body 10 is installed in a fuel cell housing body 40 of, e.g., stainless. The pipe 41, through which the reforming gas flows, is embedded in an electrode 13 of the fuel cell body 10. Similarly, a heat insulating material 42, in which the pipe 41 is embedded, is provided so as to cover the fuel cell body 10. Moreover, the pipe 41 is embedded in a side wall 43 of the fuel cell housing body 40.

It is not always required to provide the pipe 41 in all the electrode 13, the heat insulating material 42 and the side wall 43, and it may be provided in a part thereof. If the pipe 41 is provided in the electrode 13 maintained at a high temperature, methanol can be preheated by transferring the heat of the electrode 13 to the pipe 41, and the resistance at the connection point, at which the electrode 13 is connected to the outside of the fuel cell, can be decreased. Alternatively, the pipe 41 may be provided on the surface, not embedded in the electrode 13, the heat insulating material 42 or the side wall 43. It is not always required to form the U-shaped pipe 41, and the pipe 41 may have various shapes as long as the heat of the reforming gas flowing through the pipe 41 can be utilized to preheat the fuel cell body 10 or maintain the temperature of the fuel cell body 10.

With this construction, the operation of the tenth preferred embodiment of a fuel cell, according to the present invention, will be described. The fuel cell body 10 in the fuel cell housing body 40 is heated by the reforming gas flowing through the pipe 41. The fuel cell body 10 is warmed directly by the heat of the pipe 41 provided in the electrode 13. The fuel cell body 10 is also warmed indirectly by the heat of the pipe 41 provided in the heat insulating material 42 and the pipe 41 provided in the side wall 43. The heat insulating material 42 covers the fuel cell body 10 to inhibit the heat loss of the fuel cell body 10.

In the tenth preferred embodiment as described above, the temperature of the fuel cell body 10 is maintained in the range of from 600° C. to 750° C., and it is not required to provide an additional heat source required to set the temperature of the fuel cell body 10 at a predetermined temperature, so that the heat (exhaust heat) can be effectively utilized to reduce the costs.

Referring to FIG. 22, the eleventh preferred embodiment of a fuel cell, according to the present invention, will be described below. The feature of the eleventh preferred embodiment is that a separate fuel-gas passage, not the hydrogen containing gas passage formed in the separator comprising the laminated single cells in the aforementioned preferred embodiments, serving as temperature control means is provided outside a fuel cell body and heating means is provided in the passage.

FIG. 22 is a partially-cut perspective view of an internal reforming type fuel cell. In FIG. 22, the same reference numbers are used for the same elements as those in the described preferred embodiments, and the duplicate descriptions are omitted. A heater 50 serving as heating means is provided on the outer wall of a conduit 17 for supplying a fuel gas. A single cell 11 has a fuel electrode 5 and an oxidizer electrode 7 which are provided on both sides of an electrolyte layer 6. A plurality of single cells 11 are laminated to form a laminated body 12. Air serving as an oxidizer is supplied to a fuel cell via a conduit 18 to be supplied to a target-power level hold 16 in the cell. The flowing direction of the fuel gas is perpendicular to that of the oxidizer gas.

In the eleventh preferred embodiment as described above, even if the fuel gas is methanol, it is possible to rapidly heat the fuel gas from the reforming temperature to the cell reaction temperature to inhibit carbon from being deposited.

Furthermore, the present invention should not be limited to the preferred embodiments as described above, but the invention can be embodied in various ways without departing from the principle of the invention. For example, the fuel may be lower alcohols or esters. The anode may contain, as a catalyst, ruthenium, nickel, platinum, copper or a mixture thereof. If the catalyst is ruthenium, it is possible to inhibit carbon from being deposited at a low temperature. The number of the manifolds formed in the separator is not always required to be 4, but it may be any numbers as long as the fuel or the oxidizer can be efficiently dispersed.

As described above, according to the present invention, it is possible to inhibit carbon from being deposited, and to uniformly maintain the temperature distribution and current density distribution in the fuel cell.

What is claimed is:

1. A fuel cell comprising:

fuel supply means for supplying a fuel having a reforming temperature lower than a first temperature at which said fuel will be reformed;

gas generating means for reforming or decomposing a fuel supplied from said fuel supply means, to generate a gas which contains at least hydrogen;

temperature control means for raising the temperature of said hydrogen containing gas generated by said gas generating means from a second temperature to a third temperature, and for maintaining the temperature of said hydrogen containing gas at least at said third temperature to prevent an occurrence of the Boudard reaction; and power generating means having at least one pair of electrodes including a fuel electrode, to which the temperature controlled hydrogen containing gas is supplied, and an oxidizer electrode, which is arranged so as to face said fuel electrode via an electrolyte layer and to which an oxidizer is supplied.

2. A fuel cell as set forth in claim 1, wherein said first temperature of the fuel supplied from said fuel supply means is 450° C. and wherein said temperature control means raises the temperature of said hydrogen containing gas from 300° C. serving as said second temperature to 600° C. serving as said third temperature to prevent an occurrence of the Boudard reaction, and controls to maintain the temperature of said hydrogen containing gas at a temperature above 600° C. serving as said third temperature before said hydrogen containing gas is supplied to said fuel electrode.

3. A fuel cell as set forth in claim 2, wherein said fuel supplied to said fuel supply means is methanol, and wherein said gas generating means gasifies and reforms said methanol supplied as the fuel at a temperature of 300° C. of said methanol, and said temperature control means supplies said gasified methanol to said fuel electrode of said power generating means while raising the temperature of the gasified methanol from 300° C. to 600° C.

4. A fuel cell as set forth in claim 3, which further comprises:

a flow detecting section, provided between said fuel tank or a water tank for storing water and said fuel cell, for detecting a flow rate of methanol or water supplied form said fuel tank or said water tank to derive a mixing ratio of methanol and water; and a flow control section, provided between said fuel tank or said water tank and said flow detecting section, for receiving a result detected by said flow detecting section as a control signal to control the flow rates so that the mixing ratio is controlled.

5. A fuel cell as set forth in claim 2, wherein said fuel is decomposed or reformed by utilizing heat generated in said fuel cell.

6. A fuel cell as set forth in claim 2, wherein said fuel cell is cooled by removing heat generated in said fuel cell by decomposing or reforming said fuel.

7. A fuel cell as set forth in claim 2, wherein said temperature control means comprises at least one pair of fluid passages provided on both ends of said power generating means.

8. A fuel cell as set forth in claim 7, wherein said fluid passages serving as said temperature control means are formed in both ends of said power generating means so as to be arranged on a diagonal of said power generating means.

9. A fuel cell as set forth in claim 7, wherein said pair of fluid passages serving as said temperature control means have different size.

10. A fuel cell as set forth in claim 1, wherein said power generating means generates electricity by allowing said hydrogen containing gas supplied to said fuel electrode, to react with said oxidizer supplied to said oxidizer electrode in a cell reaction temperature range of from 600° C. to 750° C.

11. A fuel cell as set forth in claim 1, wherein said power generating means comprises a plurality of laminated single cells, each of which comprises said electrolyte layer and said pair of electrodes facing each other via the electrolyte layer, and wherein said temperature control means comprises a separator, which is inserted into a gap between the adjacent laminated single cells in a direction perpendicular to the laminating direction of the single cells and which has a fluid passage for allowing said hydrogen containing gas supplied to said fuel electrode to flow while controlling the temperature of said hydrogen containing gas.

12. A fuel cell as set forth in claim 11, wherein said separator comprises a first manifold serving as said fluid passage for supplying said hydrogen containing gas to said fuel electrode of said power generating means while controlling the temperature of said hydrogen containing gas, and a second manifold for allowing said oxidizer supplied to said oxidizer electrode of said power generating means to flow.

13. A fuel cell as set forth in claim 12, wherein a flowing direction of said hydrogen containing gas supplied to said fuel electrode via said first manifold is opposite to a flowing direction of said oxidizer supplied to said oxidizer electrode via said second manifold, in a plane perpendicular to the laminating direction of said single cells.

14. A fuel cell as set forth in claim 12, wherein the flowing direction of said hydrogen containing gas supplied to said fuel electrode via said first manifold intersects the flowing direction of said oxidizer supplied to said oxidizer electrode via said second manifold, in a plane perpendicular to the laminating direction of said single cells.

15. A fuel cell as set forth in claim 11, which further comprises a hydrogen containing gas supplying portion provided between said electrode and said separator for supplying said hydrogen containing gas to said electrode, said hydrogen containing gas supplying portion having hydrogen containing gas supply ports which has an uneven rate of hole area per unit area.

16. A fuel cell as set forth in claim 11, which further comprises gasify inhibiting means, provided at least in a part of a fluid passage, through which said fuel flows, for inhibiting said fuel from being reformed or decomposed to be said hydrogen containing gas before the fuel fed from said fuel supplying means is supplied to said fuel electrode of said power generating means.

17. A fuel cell as set forth in claim 1, wherein a pipe, through which said hydrogen containing gas flows, is provided in or on at least one of said electrode, a heat insulating material covering said fuel cell, and a fuel cell housing body for housing the fuel cell covered by said heat insulating material.

18. A fuel cell as set forth in claim 1, which further comprises a flow detecting section for detecting flow rates of said fuel supplied to said fuel electrode and water to derive a mixing ratio of said fuel to said water, and a flow control section for controlling said flow rates of said fuel and said water on the basis of said mixing ratio detected by said flow detecting section so that said mixing ratio of said fuel to said water is a desired mixing ratio.

19. A fuel cell as set forth in claim 18, wherein said flow detecting section and said flow control section are provided between a fuel tank serving as said fuel supplying means and said fuel electrode of said power generating means.

20. A fuel cell as set forth in claim 11, wherein said temperature control means comprises a fluid passage portion, provided in or on at least one of a heat insulating material covering said single cell and a fuel cell housing body having the heat insulating material, for allowing a methanol containing fluid to flow.

21. A fuel cell as set forth in claim 2, wherein a hydrogen containing fluid is supplied to said fuel electrode at least before said fuel cell carries out a steady power generation.

22. A fuel cell as set forth in claim 2, wherein said temperature control means comprises heating means provided in a supply pipe for supplying the reformed hydrogen containing gas to said power generating means.

23. A fuel cell as set forth in claim 2, wherein said fuel supplied from said fuel supply means is ethanol, and wherein said gas generating means gasifies and reforms said ethanol supplied as the fuel at a temperature below 450° C. of said ethanol, and said temperature control means rapidly supplies said gasified ethanol to said fuel electrode of said power generating means while raising the temperature of the gasified ethanol from 450° C. to 600° C.

24. A fuel cell as set forth in claim 2, wherein said fuel supplied from said fuel supply means is dimethyl ether, and wherein said gas generating means gasifies and reforms said dimethyl ether supplied as the fuel at a temperature above 450° C. of said dimethyl ether, and said temperature control means rapidly supplies said gasified dimethyl ether to said fuel electrode of said power generating means while raising the temperature of the gasified dimethyl ether from 450° C. to 600° C.

25. A fuel cell as set forth in claim 2, wherein said fuel supplied from said fuel supply means is propane, and wherein said gas generating means gasifies and reforms said propane supplied as the fuel at a temperature below 450° C. of said propane, and said temperature control means rapidly supplies said gasified propane to said fuel electrode of said power generating means while raising the temperature of the gasified propane from 450° C. to 600° C.

26. A fuel cell as set forth in claim 1, wherein the temperature of said hydrogen containing gas increases from said second predetermined temperature to said third predetermined temperature with suppressing the deposition of carbon.

* * * * *